(12) United States Patent
Moriyama et al.

(10) Patent No.: US 9,789,903 B2
(45) Date of Patent: Oct. 17, 2017

(54) TORQUE TRANSMISSION JOINT AND ELECTRIC POWER STEERING APPARATUS

(71) Applicant: NSK Ltd., Tokyo (JP)

(72) Inventors: Seiichi Moriyama, Maebashi (JP); Kazuhiko Kojima, Maebashi (JP)

(73) Assignee: NSK LTD., Tokyo (JP)

( * ) Notice: Subject to any disclaimer, the term of this patent is extended or adjusted under 35 U.S.C. 154(b) by 24 days.

(21) Appl. No.: 14/387,849

(22) PCT Filed: Nov. 5, 2013

(86) PCT No.: PCT/JP2013/079880
§ 371 (c)(1),
(2) Date: Sep. 25, 2014

(87) PCT Pub. No.: WO2014/073526
PCT Pub. Date: May 15, 2014

(65) Prior Publication Data
US 2015/0298733 A1    Oct. 22, 2015

(30) Foreign Application Priority Data

Nov. 6, 2012 (JP) .................................. 2012-244247
Nov. 6, 2012 (JP) .................................. 2012-244248
(Continued)

(51) Int. Cl.
*F16D 3/64* (2006.01)
*B62D 5/04* (2006.01)
(Continued)

(52) U.S. Cl.
CPC ........... *B62D 7/224* (2013.01); *B62D 5/0409* (2013.01); *B62D 5/0454* (2013.01); *F16D 3/68* (2013.01);
(Continued)

(58) Field of Classification Search
CPC ........ B62D 5/04; B62D 5/0403; B62D 5/043; B62D 5/008; F16D 3/64; F16C 3/68
See application file for complete search history.

(56) References Cited

U.S. PATENT DOCUMENTS 2,074,941 A * 3/1937 Ricefield ................... F16D 3/68
                                                    464/73
3,396,556 A * 8/1968 Giegerich ................. F16D 3/50
                                                    464/73
(Continued)

FOREIGN PATENT DOCUMENTS

CN    102639892 A    8/2012
EP    2 916 022 A1   9/2015
(Continued)

OTHER PUBLICATIONS

Office Action dated Apr. 6, 2016 in Chinese Patent Application No. 201380022258.5.
(Continued)

*Primary Examiner* — Tony H. Winner
(74) *Attorney, Agent, or Firm* — Shapiro, Gabor and Rosenberger, PLLC

(57) ABSTRACT

Provided is a torque-transmission joint 15a that is able to reduce the thrust force that is transmitted between the output shaft 12a of an electric motor 8 and a worm shaft 6a without generating noise. A shock-absorbing member 18a that is made using an elastic material is assembled between a driving-side transmission member 16a that is supported by the output shaft 12a and a driven-side member 17a that is supported by the worm shaft 6a. Held sections 33a, 33b of the shock-absorbing member 18a are located between the side surfaces in the circumferential direction of driving-side arm sections 21a of the driving-side transmission member 16a and side surfaces in the circumferential direction of driven-side arm sections 23a of the driven-side transmission (Continued)

member 17a. A damper section 26 is integrally provided with the shock-absorbing member 18a, and that damper section 26 is elastically held between the tip-end surface of the output shaft 12a and the base-end surface of the worm shaft 16a.

12 Claims, 37 Drawing Sheets

(30) Foreign Application Priority Data

Nov. 7, 2012 (JP) ................................ 2012-245063
Dec. 26, 2012 (JP) ................................ 2012-282051

(51) Int. Cl.
*B62D 7/22* (2006.01)
*F16D 3/68* (2006.01)
*F16F 15/136* (2006.01)
*F16H 1/16* (2006.01)
*F16F 15/124* (2006.01)

(52) U.S. Cl.
CPC ........ *F16F 15/1245* (2013.01); *F16F 15/136* (2013.01); *F16H 1/16* (2013.01)

(56) References Cited

U.S. PATENT DOCUMENTS

| | | | | | |
|---|---|---|---|---|---|
| 3,837,179 | A | * | 9/1974 | Barth | F16D 3/68 464/182 |
| 5,700,198 | A | * | 12/1997 | Takano | F16D 3/28 464/71 |
| 5,720,638 | A | * | 2/1998 | Hale | F16D 3/68 440/111 |
| 5,928,083 | A | * | 7/1999 | Monahan | F16D 3/68 192/41 R |
| 6,491,131 | B1 | | 12/2002 | Appleyard | |
| 7,699,708 | B2 | * | 4/2010 | Kubota | F16D 3/68 180/444 |
| 7,699,709 | B2 | * | 4/2010 | Kubota | F16D 3/68 464/149 |
| 8,505,675 | B2 | * | 8/2013 | Suzuki | B62D 5/0409 180/444 |
| 8,616,986 | B2 | * | 12/2013 | Nakagawa | B62D 5/0409 464/76 |
| 2003/0136211 | A1 | | 7/2003 | Ishii et al. | |
| 2005/0072620 | A1 | * | 4/2005 | Joushita | F16D 3/68 180/444 |
| 2006/0205293 | A1 | | 9/2006 | Fuse | |
| 2008/0009354 | A1 | * | 1/2008 | Hodjat | F16D 3/68 464/87 |
| 2008/0035414 | A1 | * | 2/2008 | Kubota | F16D 3/68 180/444 |
| 2008/0128195 | A1 | | 6/2008 | Kubota et al. | |
| 2010/0113164 | A1 | * | 5/2010 | Rothe | F16F 15/124 464/73 |
| 2011/0319176 | A1 | * | 12/2011 | Rothe | F16F 15/1245 464/71 |
| 2012/0061168 | A1 | * | 3/2012 | Hamakita | B62D 5/0409 180/444 |
| 2012/0202605 | A1 | * | 8/2012 | Cassell | F16D 3/223 464/85 |
| 2012/0208649 | A1 | | 8/2012 | Nakagawa et al. | |
| 2012/0264524 | A1 | | 10/2012 | Nakagawa et al. | |
| 2013/0252745 | A1 | | 9/2013 | Shirai | |

FOREIGN PATENT DOCUMENTS

| | | |
|---|---|---|
| JP | 3-73745 U | 7/1991 |
| JP | 06-337021 A | 12/1994 |
| JP | 09-004647 A | 1/1997 |
| JP | 2000-043739 A | 2/2000 |
| JP | 2004-306898 A | 11/2004 |
| JP | 2006-513906 A | 4/2006 |
| JP | 2006-183676 A | 7/2006 |
| JP | 2007-186021 A | 7/2007 |
| JP | 2008-240836 A | 10/2008 |
| JP | 4523721 B2 | 8/2010 |
| JP | 2011-102610 A | 5/2011 |
| JP | 2011-137488 A | 7/2011 |
| JP | 4779358 B2 | 9/2011 |
| JP | 2012-127472 A | 7/2012 |
| WO | WO 2004/074071 A1 | 9/2004 |

OTHER PUBLICATIONS

Office Action dated Oct. 18, 2016, in Japanese Patent Application No. 2015-250485.

Extended European search report (including supplementary European search report and search opinion) from European Patent Application No. 13853198.3, dated Dec. 6, 2016.

* cited by examiner

Fig.26
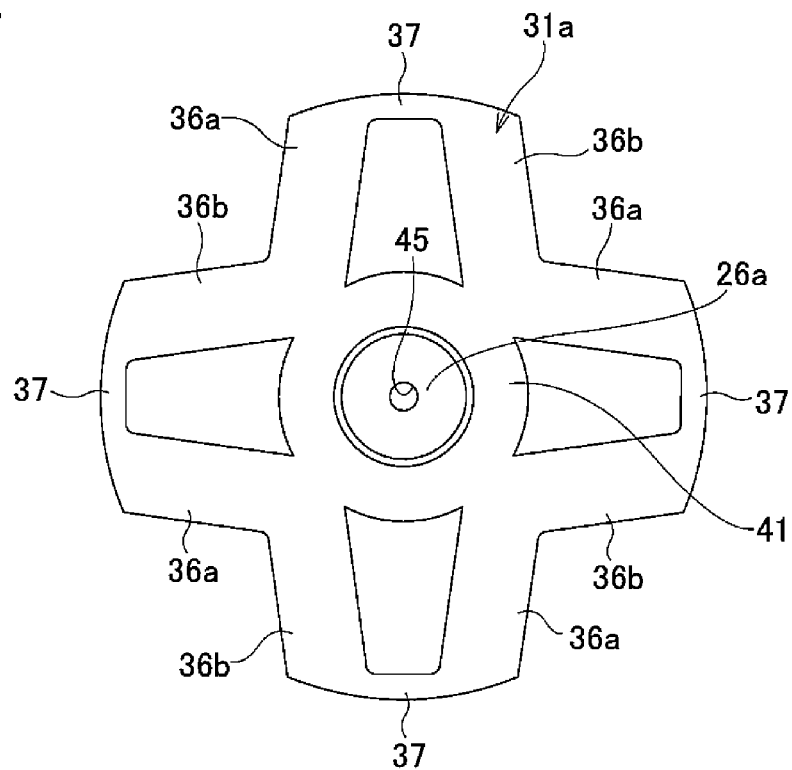
Fig.27(A)  Fig.27(B)  Fig.27(C)
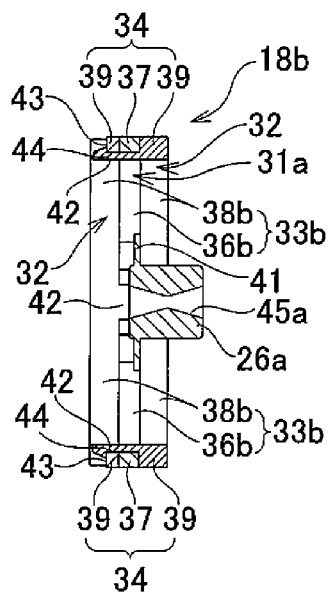 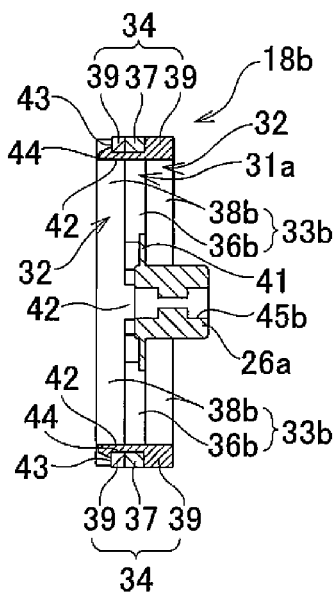 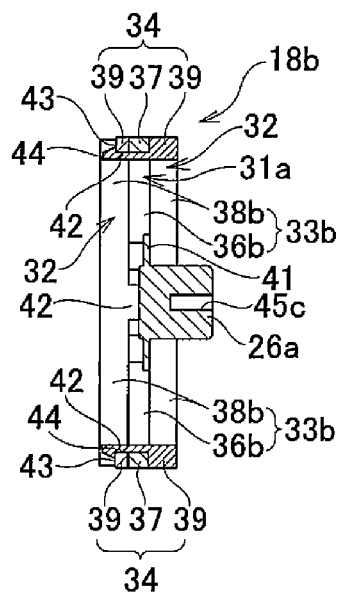

US 9,789,903 B2

TORQUE TRANSMISSION JOINT AND ELECTRIC POWER STEERING APPARATUS

TECHNICAL FIELD

The present invention relates to an electric power steering apparatus that uses an electric motor as an auxiliary power source, and is a mechanism for assisting an operator to steer an automobile, and relates to a torque transmission joint that is assembled in various kinds of machinery that includes this electric power steering apparatus, and is used for transmitting torque between a driving shaft and a driven shaft.

BACKGROUND ART

When applying a steering angle to steered wheels (normally the front wheels except in the case of special vehicles such as a forklift and the like), power steering apparatuses are widely used in order to reduce the force required for the operator to operate the steering wheel. In recent years, as this kind of power steering apparatus, the use of electric power steering apparatuses that use an electric motor as the auxiliary power source are becoming wide spread. Typically, in an electric power steering apparatus, the auxiliary force from an electric motor is applied by way of a reduction gear to a rotating shaft that applies a steering angle to the steered wheels by being rotated by the operation of a steering wheel. Normally, a worm reduction gear is used as this reduction gear. More specifically, by the worm of a worm reduction gear that is rotated and driven by an electric motor engaging with the worm wheel that rotates together with the rotating shaft, the auxiliary power from the electric motor can be transmitted to the rotating shaft. However, in a worm reduction gear, unless certain measures are taken, there are cases in which, due to backlash in the area of engagement between the worm and worm wheel, unpleasant noise called chattering will occur when changing the direction of rotation of the rotating shaft.

In order to suppress the occurrence of this chattering, construction that elastically presses the worm toward the worm wheel has been disclosed in JP 2000-043739 (A), JP 2004-305898 (A) and JP 2006-513906 (A) (WO 2004/074071). FIG. 52 and FIG. 53 illustrate an example of an electric power steering apparatus as disclosed in JP 2004-305898 (A). The front-end section of a steering shaft 2 that is rotated in a specified direction by a steering wheel 1 is supported on the inside of a housing 3 so as to be able to rotate freely, and a worm wheel 4 is fastened to the front-end section of that steering shaft 2. On the other hand, a worm 5 that is rotated and driven by an electric motor 8 is provided in the middle section in the axial direction of a worm shaft 6, and has worm teeth 7 that engage with the worm wheel 4. Both end sections in the axial direction of the worm shaft 6 are supported inside the housing 3 by a pair of rolling bearings 9a, 9b such as deep-groove ball bearings so as to be able to rotate freely. A pressure piece 10 is fitted around a portion of the tip-end section of the worm shaft 6 that protrudes out further than the rolling bearing 9a, and an elastic member such as a coil spring 11 is provided between the pressure piece 10 and the housing 3. The coil spring 11 presses the worm teeth 7 that are provided on the worm shaft 6 toward the worm wheel 4 by way of the pressure piece 10. With this kind of construction, backlash that occurs between the worm teeth 7 and the worm wheel 4 is suppressed, and the occurrence of chattering is reduced.

However, in this conventional construction, it is not possible to suppress chattering that occurs at the joint between the tip-end section of the output shaft 12 of the electric motor 8 and the base end section of the worm shaft 6. In the construction illustrated in the figures, the tip-end section of the output shaft 12 and the base-end section of the worm shaft 6 are joined so that torque can be transmitted by spline engagement between a spline hole 13 that is provided in the base-end section of the worm shaft 6 and a spline shaft section 14 that is provided on the tip-end section of the output shaft 12 of the electric motor 8. As long as the spline hole 13 and the spline shaft section 14 engage with no space between them in the circumferential direction (no backlash), chattering will not occur at the joint section (area of spline engagement) between the tip-end section of the output shaft 12 and the base-end section of the worm shaft 6. However, in actuality, there is backlash in the area of spline engagement. Particularly, in construction for suppressing backlash between the worm teeth 7 and the worm wheel 4, it is necessary to allow for pivotal displacement of the worm shaft 6, so it is not possible to completely eliminate backlash in the joint section between the tip-end section of the output shaft 12 and the base-end section of the worm shaft 6, and thus it is difficult to prevent the occurrence of chattering in the joint section.

As construction for preventing the occurrence of chattering in the joint section between the tip-end section of the output shaft 12 and the base-end section of the worm shaft 6, JP H03-73745 (U) and JP 4,523,721 (B2) disclose construction in which the end section of a driving shaft and the end section of a driven shaft are joined by way of a torque-transmission joint (coupling, shaft joint) that has a shock-absorbing member that is made using an elastic material. FIG. 54 and FIG. 55 illustrate a torque-transmission joint 15 having conventional construction as disclosed in JP H03-73745 (U). The torque-transmission joint 15 has a driving-side transmission member 16 made of metal that is supported so as to be concentric with the tip-end section of the output shaft 12 of an electric motor 8, which is the driving shaft; a driven-side transmission member 17 made of metal that is supported so as to be concentric with the base-end section of a worm shaft 6, which is the driven shaft; a shock-absorbing member 18 made of rubber that is provided between the driving-side transmission member 16 and the driven-side transmission member 17; and a steel ball 19.

The driving-side transmission member 16 has: a circular plate shaped driving-side base section 20 that is supported by the tip-end section of the output shaft 12 such that relative rotation is not possible; and three driving-side arm sections 21 that are provided on the surface of the driving-side base section 20 that faces the driven-side transmission member 17 so as to be intermittently spaced in the circumferential direction and so as to protrude in the axial direction. On the other hand, the driven-side transmission member 17 has a circular plate-shaped driving-side base section 22 that is supported by the base-end section of the worm shaft 6 such that relative rotation is not possible, and three driven-side arm sections 23 that are provided on the surface of the driven-side base section 22 that faces the driving-side transmission member 16 so as to be intermittently spaced in the circumferential direction and so as to protrude in the axial direction. The shock-absorbing member 18 is made using an elastic material such as rubber and has: a hollow cylindrical shaped cylindrical section 24, and six held sections 25 that extend in the radial direction from the outer-circumferential surface of the cylindrical section 24 (on virtual lines that pass through the center axis of the shock-absorbing member 18 and extend in the radial direction). In the assembled state of the torque-transmission joint 15, the driving-side arm sections 21 and the driven-side arm sections 23 are arranged in an alternating manner in the circumferential direction. Moreover, held sections 25 are located between the side surfaces in the circumferential direction of driving-side arm sections 21 and driven-side arm sections 23 that are adjacent in the circumferential direction. Furthermore, the steel ball 19 is held by the tip-end surface of the output shaft 12 and the base-end surface of the worm shaft 6. Therefore, direct contact between the metal driving-side arm sections 21 and the metal driven-side arm sections 23 is prevented, and the occurrence of chattering in this portion is suppressed. During operation, thrust force is transmitted between the output shaft 12 and the worm shaft 6 by way of the steel ball 19, however, thrust force is not transmitted to the shock-absorbing member 18. Therefore, durability of the shock-absorbing member 18 is maintained over a long period of time.

However, in the torque-transmission joint 15, the thrust force that is transmitted between the output shaft 12 and the worm shaft 6 cannot be absorbed by the steel ball 19, so this thrust force cannot be reduced. Therefore, there is a possibility that the thrust force that is transmitted between the output shaft 12 and the worm shaft 6 will become excessively large. Moreover, in forward rotation and reverse rotation of the electric motor 8, thrust forces in opposite directions in the axial direction act on the worm shaft 6, so there is a tendency for the worm shaft 6 to move in the axial direction and become loose, and the steel ball 19 is not able to suppress this looseness of the worm shaft 6. Therefore, there is a possibility that the worm shaft 6 and output shaft 12 will collide with the steel ball 19 with much force, causing noise to occur.

The held sections 25 of the shock-absorbing member 18 are arranged in the radial direction, so in the assembled state of the torque-transmission joint 15, the shock-absorbing member 18 is only exposed to the outside between the driving-side arm sections 21 and driven-side arm sections 23 that are adjacent in the circumferential direction. Therefore, in this torque-transmission joint 15, because it is difficult to visually check the shock-absorbing member 18, there is also a problem in that it becomes easy for a decrease to occur in the work efficiency of the inspection process for preventing assembly of the shock-absorbing member from being forgotten.

Furthermore, in the construction of the torque-transmission joint 15, it is not possible to effectively absorb errors such as dimensional errors or assembly errors of the components of the electric power steering apparatus. For example, when so-called alignment error occurs in which the positional relationship between the center axis of the outer shaft 12 and the center axis of the worm shaft 6 does not coincide, this alignment error is absorbed by elastic deformation of part of the cylindrical section 24 and the held sections 25 of the shock-absorbing member 18. Therefore, the easier it is for elastic deformation of the shock-absorbing member 18 (mainly the cylindrical section 24) to occur, the larger the error is that can be absorbed. However, in the construction of the torque-transmission joint 15, the held sections 25 are arranged in the radial direction, and the driving-side arm sections 21 and driven-side arm sections 23 also are arranged such that the surfaces on the sides in the circumferential direction extend in the radial direction. In other words, virtual planes that include the surfaces on the sides in the circumferential direction of the driving-side arm sections 21 and the driven-side arm sections 23 include the center axes of the driving-side transmission member 16 and the driven-side transmission member 17. Therefore, when the output shaft 12 is rotated and driven and torque begins to be transmitted, a force acts on the held sections 25 that are located between the side surfaces in the circumferential direction on the front side in direction of rotation of the driving-side arm sections 21 and the side surfaces in the circumferential direction on the rear side in the direction of rotation of the driven-side arm sections 23 so as to cause uniform elastic contraction in the circumferential direction from the base-end section to the tip-end section. As a result, a force acts on the cylindrical sections 24 in the pulling direction and it becomes difficult for the cylindrical sections 24 to elastically deform in the radial direction, so together with becoming difficult for the shock-absorbing member 18 to sufficiently absorb the alignment error, surface pressure at the portions of the areas of contact between the outer circumferential surface of the cylindrical section 24 and the inner-circumferential side surfaces of the driving-side arm sections 21 and driven-side arm sections 23 becomes excessive, and there is a possibility that due to increasing the friction resistance in these portions, the transmission efficiency of the overall electric power steering apparatus system will decrease.

In JP 4,779,358 (B2), construction is disclosed in which a shock-absorbing member has three members that are placed together in the axial direction, however, in this construction as well, the held sections of the shock-absorbing member are arranged in the radial direction, so it is difficult to sufficiently absorb alignment error and the like.

RELATED LITERATURE

Patent Literature

[Patent Literature 1] JP 2000-043739 (A)
[Patent Literature 2] JP 2004-306898 (A)
[Patent Literature 3] JP 2006-513906 (A) (WO 2004/074071)
[Patent Literature 4] JP H03-73745 (U)
[Patent Literature 5] JP 4,523,721 (B2)

SUMMARY OF INVENTION

Problem to be Solved by Invention

Taking into consideration the problems described above, the object of the present invention is to provide a torque-transmission joint that, together with being able to prevent the occurrence of noise due to relative displacement of a driving shaft and driven shaft, is able to absorb thrust force that is transmitted between the driving shaft and driven shaft, is able to improve the transmission efficiency of transmitting torque, and also has excellent durability, and an electric power steering apparatus that has the above torque-transmission joint.

Means for Solving Problems

The torque-transmission joint of the present invention transmits torque between a driving shaft and a driven shaft that are arranged in series with each other in the axial direction, and has: a driving-side transmission member that is concentrically supported by the end section of the driving shaft; a driven-side transmission member that is concentrically supported by the end section of the driven shaft; and a shock-absorbing member made using an elastic material and that is provided between the driving-side transmission member and the driven-side transmission member.

The driving-side transmission member has: a driving-side base section that is supported by the end section of the driving shaft; and plural driving-side arm sections that are provided intermittently in the circumferential direction on the surface of the driving-side base section that faces the driven-side transmission member, and that protrude in the axial direction. Moreover, the driven-side transmission member has: a driven-side base section that is supported by the end section of the driven shaft; and plural driven-side arm sections that are provided intermittently in the circumferential direction on the surface of the driven-side base section that faces the driving-side transmission member, and that protrude in the axial direction. Furthermore, the shock-absorbing member has plural held sections. Together with arranging the driving-side arm sections and the driven-side arm section in an alternating manner in the circumferential direction, the held sections are placed in between the side surfaces in the circumferential direction of the driving-side arm sections and the driven-side arm sections that are adjacent in the circumferential direction.

Particularly, in the torque-transmission joint of the present invention, a damper section that is held between the end surfaces of the driving shaft and the driven shaft is integrally provided with the shock-absorbing member. Preferably, a deformation adjustment section that is concave inward or protrudes out in the axial direction from the end surface in the axial direction of the damper section is provided in the damper section.

In construction in which the deformation adjustment section is concave inward in the axial direction from the end surface in the axial direction of the damper section, the deformation adjustment section can be constructed using a hollow hole that opens to the end surface in the axial direction of the damper section. The number of hollow holes is not limited to one, and it is also possible to provide plural hollow holes, and those hollow holes can be through holes that penetrate through the damper section in the axial direction and are open to both end surfaces in the axial direction of the damper section; or those hollow holes can be holes with a bottom that are open to only one side surface of the damper section. Furthermore, it is also possible to provide the through hole in the center section of the damper section, and form the damper section so as to have a hollow cylindrical shape such as a circular cylindrical shape or square tubular shape.

On the other hand, in construction in which the deformation adjustment section protrudes out from the end surface in the axial direction of the damper section, the deformation adjustment section can be constructed using a convex section that protrudes out from the end surface in the axial direction of the damper section. In that case, the convex section can be constructed using a convex curved surface section that is provided over the entire end surface in the axial direction of the damper section. The surface of that convex curved surface section can be constructed using a surface that is part of a spherical surface that protrudes the most in the axial direction at a point on the center axis of the damper section. The spherical surface is not just a so-called spherical surface (circular spherical surface) that is obtained by rotating a circle around the diameter as an axis of rotation, but also includes an elliptical spherical surface (rotated elliptical surface) that is obtained by rotating an ellipse around the minor axis or major axis as an axis of rotation. It is particularly preferred that the convex curved surface section be formed into a semi-elliptical spherical shape.

The convex section can also be constructed using a protruding section that is provided in the center section of the end surface in the axial direction of the damper section. As long as that protruding section protrudes out in the axial direction with respect to the remaining part of one end surface in the axial direction of the damper section (part separated from the protruding section), the shape of the protruding section is not particularly limited, and as the shape of that protruding section, in addition to a spherical shape or partial spherical shape, it is also possible to employ various shapes such as a semi-elliptical spherical shape, a partial elliptical spherical shape, a conical or pyramidal shape, a column shape and the like.

The shock-absorbing member is preferably constructed into a non-circular tubular shape. More specifically, each of the plural held sections has a substantially flat plate shape as a whole, and a combined held section is constructed by: a pair of held sections of the plural held sections that are adjacent in the circumferential direction, that are mirror symmetrical about a virtual plane that includes the center axis of the shock-absorbing member, and that are inclined with respect to the radial direction in a direction toward the virtual plane while going toward the outside in the radial direction; and an outer-diameter cover section that connects the end sections on the outer-diameter side of the pair of held sections. The shock-absorbing member is formed into a non-circular tubular shape by arranging a plurality of the combined held sections so as to be uniformly spaced in the circumferential direction. The combined held sections that are adjacent to each other are directly connected by the inner-diameter-side end sections of the held sections of the adjacent combined held sections that are adjacent to each other, or by way of an inner-diameter-side cover section that connects to these inner-diameter-side end sections. The pair of held sections that constitutes each of the combined held sections, by having the relationship as described above, are inclined such that the size of the angle of inclination with respect to the radial direction is the same, however, are inclined such that the direction of inclination is reversed. Moreover, the combined held sections are preferably arranged at three or four locations that are uniformly spaced in the circumferential direction. Particularly, it is preferred that the combined held sections be provided at four locations that are uniformly spaced in the circumferential direction such that the shock-absorbing member has a cross-shaped tubular shape.

In this case, preferably, of the pair of side surfaces in the circumferential direction of the arm sections of one of the driving-side arm sections and driven-side arm sections, the side surfaces in the circumferential direction that are located in the front in the direction of rotation of the driving shaft are inclined with respect to the radial direction in a direction toward the front in the direction of rotation while going toward the outside in the radial direction, the arm sections of the one of the driving-side arm sections and driven-side arm sections are located between the combined held sections that are adjacent to each other in the circumferential direction, the arm sections of the other of the driving-side arm sections and driven-side arm sections are located between the pairs of the held sections of the combined held sections, and the outer-diameter side surface of the arm sections of one of the driving-side arm sections and driven-side arm sections are covered by the outer-diameter-side cover sections.

The shock-absorbing member can be constructed by placing plural shock-absorbing pieces together in the axial direction, with the damper section being integrally provided with one of the plural shock-absorbing pieces that is preferably an inside shock-absorbing piece that is located in the middle in the axial direction. In this case, the plural shock-absorbing pieces can be constructed by plural shock-absorbing pieces having two or more different elasticities, and the shock-absorbing piece with which the damper section is integrally provided is preferably made using a material that elastically deforms more easily than the other shock-absorbing pieces. The plural shock-absorbing pieces can be joined together by the engagement of engaging sections and engaged sections of the shock-absorbing pieces.

The electric power steering apparatus of the present invention has: a housing, a rotating steering shaft, a worm wheel, a worm, an electric motor, and a torque-transmission joint. The housing is supported by a fixed portion so as not to rotate. The rotating steering shaft is provided so as to be able to rotate freely with respect to the housing, and applies a steering angle to steered wheels by being rotated by operating a steering wheel. The worm wheel is concentrically supported inside the housing by part of the rotating steering shaft, and rotates with the rotating steering shaft. The worm has a worm shaft and worm teeth that are provided around the middle section in the axial direction of the worm shaft, so that when the worm teeth are engaged with the worm wheel, both end sections in the axial direction of the worm shaft are supported by the housing by way of bearings so as to be able to rotate freely. The electric motor rotates and drives the worm. The torque-transmission joint connects the output shaft of the electric motor to the worm shaft so that torque can be transmitted, and the torque-transmission joint of the present invention described above is used as that torque-transmission joint.

In the electric power steering apparatus of the present invention, preferably construction is employed in which the end section in the axial direction of the damper section that is provided in the shock-absorbing member of the torque-transmission joint is inserted inside a concave section that is provided on the tip-end surface of the output shaft or inside a concave section that is provided on the base-end surface of the worm shaft.

Effect of Invention

With the torque-transmission joint and the electric power steering apparatus of the present invention, when a damper section that is integrally provided with a shock-absorbing member that is made using an elastic material is elastically deformed, the damper section is held between the end surfaces of the driving shaft and the driven shaft, so relative displacement between the driving shaft and the driven shaft is suppressed, and even in a case in which there is relative displacement between the driving shaft and the driven shaft, noise that is generated due to colliding shafts is effectively prevented. Moreover, due to the elastic deformation of the damper section, part of the thrust force can be absorbed, so it is possible to prevent excessive thrust force from being transmitted between the driving shaft and the driven shaft. Furthermore, there is no need to provide a separate and independent member for absorbing thrust force, and thus it is also possible to reduce cost. In addition, the installation position of the damper section can be regulated by way of the shock-absorbing member, so it is possible to stabilize the function for absorbing thrust force by the damper section.

Moreover, with the present invention, the outer-diameter-side cover sections of the combined held sections of the shock-absorbing member cover the surfaces on the outer-circumferential side of the arm sections of one of the driving-side arm sections and driven-side arm sections, so when the torque-transmission joint is assembled, it is possible to increase the surface area of the part of the shock-absorbing member that is exposed to the outside, and thus it is possible to improve the ability to visually check the shock-absorbing member. Therefore, it is possible to improve the work efficiency of the inspection process for preventing assembly of the shock-absorbing member from being forgotten.

Furthermore, in the present invention, the shock-absorbing member is constructed so that the overall shape is a flat plate shape in which the thickness in the circumferential direction does not change in the radial direction, and by providing driving-side arm sections and driven side arm section so that, of the pair of side surfaces in the circumferential direction of the arm sections of one of the driving-side arm sections and driven-side arm sections, the side surfaces in the circumferential direction located in the front in the direction of rotation of the driving shaft are inclined with respect to the radial direction in a direction toward the front in the direction of rotation while going toward the outside in the radial direction, when the driving shaft is rotated and driven and torque begins to be transmitted, a force inward in the radial direction of the shock-absorbing member acts on the held sections that are held between the side surfaces in the circumferential direction on the front side in the direction of rotation of the one arm sections, and the side surfaces in the circumferential direction on the rear side in the direction of rotation of the other arm section of the driving-side arm sections and driven-side arm sections. Therefore, it is possible to achieve a state in which the shock-absorbing member elastically deforms in the radial direction easily, so together with being able to sufficiently absorb error such as alignment error that occurs between the driving shaft and driven shaft, and dimensional error and assembly error of the components of the torque-transmission joint and of the various kinds of machinery in which the torque-transmission joint is assembled, it is also possible to improve the transmission efficiency of the overall system of the electric power steering apparatus and other various machinery.

Furthermore, in the present invention, by making the shock-absorbing piece with which the damper section is integrally provided using a material the elastically deforms easily, and/or proving a deformation adjustment section in the damper section that is concave inward or that protrudes outward in the axial direction from the end surface in the axial direction of the damper section, it is possible to change the modulus of elasticity (amount of elastic deformation) of the damper section by simply changing the dimension and shape of the deformation adjustment section, and therefore it becomes possible to easily adjust the amount of thrust force that is absorbed by the damper section of the shock-absorbing member and the size of the biasing force.

BRIEF DESCRIPTION OF DRAWINGS

FIG. 26 is an end view of the inside shock-absorbing piece of the shock-absorbing member illustrated in FIG. 20.

FIGS. 27A to 27C are cross-sectional views of three examples of substitutable shapes of the hollow hole of the damper section of the shock-absorbing member illustrated in FIG. 20.

MODES FOR CARRYING OUT INVENTION

First Example

Figure 1:
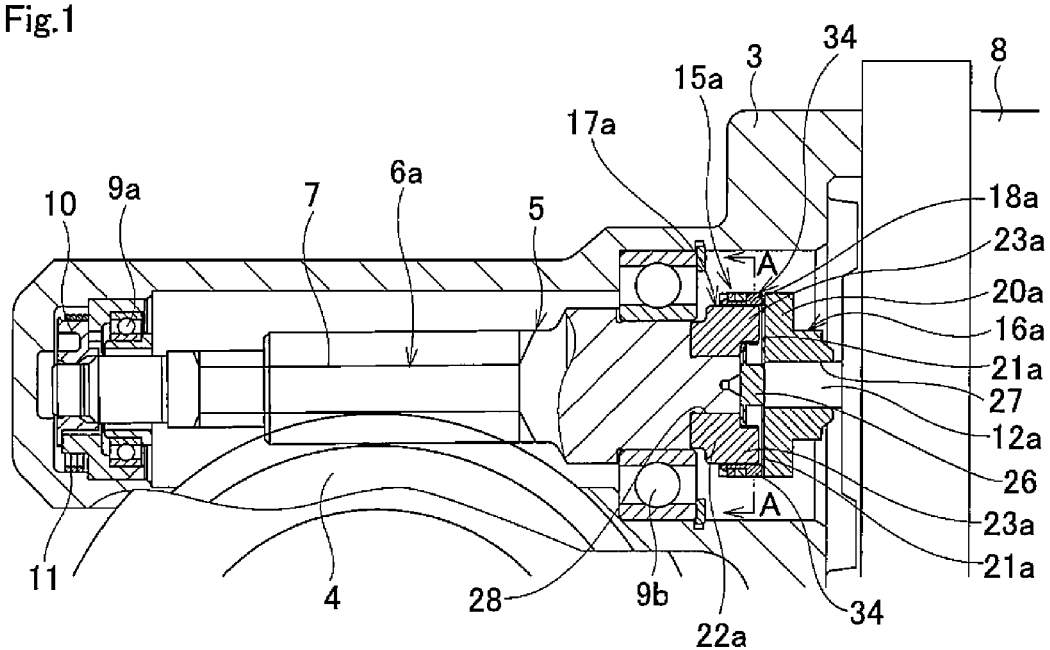
FIG. 1 is a cross-sectional view of the main parts of an electric power steering apparatus in which a torque-transmission joint of a first example of an embodiment of the present invention is assembled.
Figure 2:
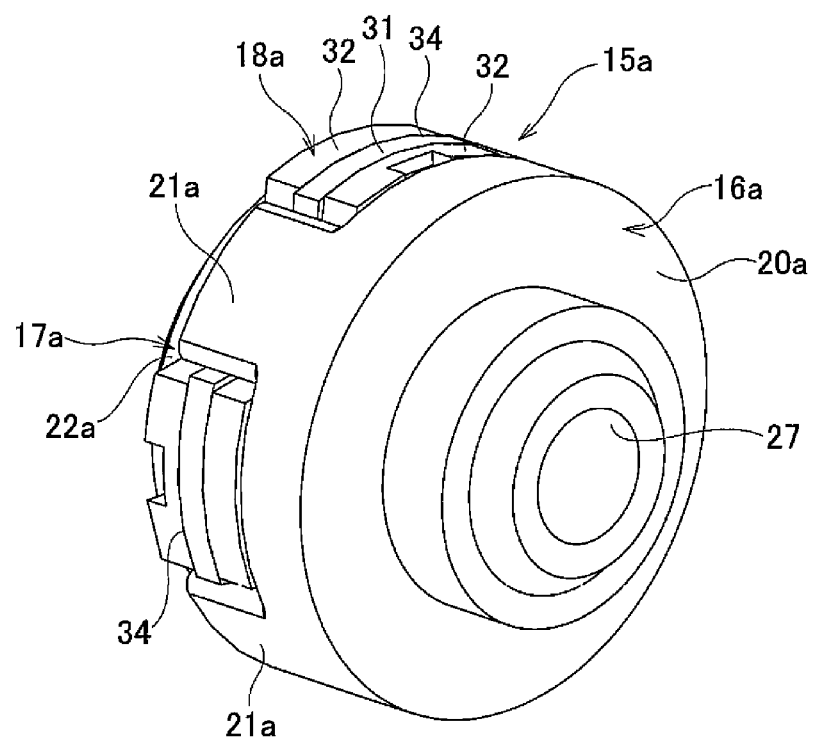
FIG. 2 is a perspective view illustrating the torque-transmission joint that has been removed from the electric power steering apparatus in FIG. 1.
Figure 3:
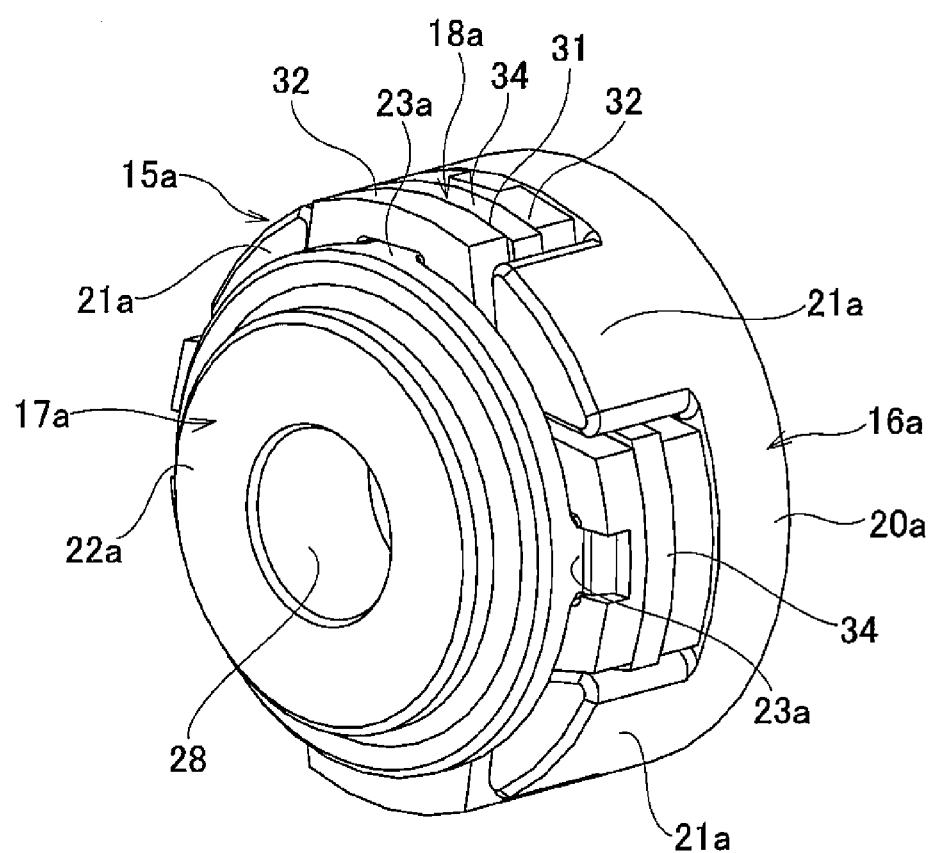
FIG. 3 is a perspective view illustrating the torque-transmission joint illustrated in FIG. 2 as seen from a different direction from FIG. 2.
Figure 4:
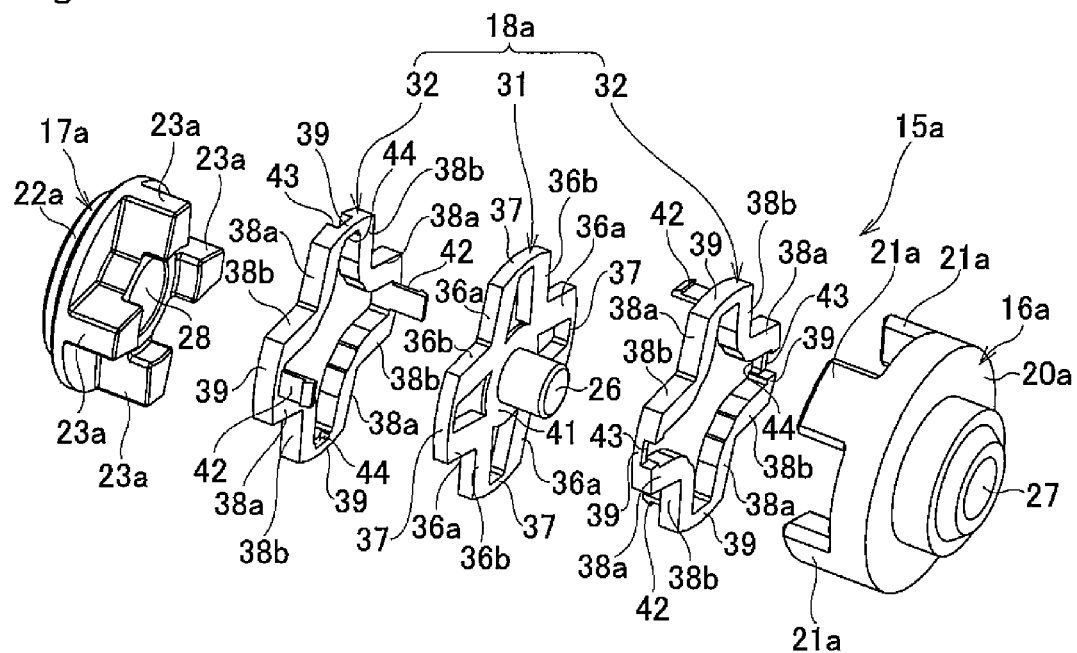
FIG. 4 is an exploded perspective view of the torque-transmission joint illustrated in FIG. 2.
Figure 5:
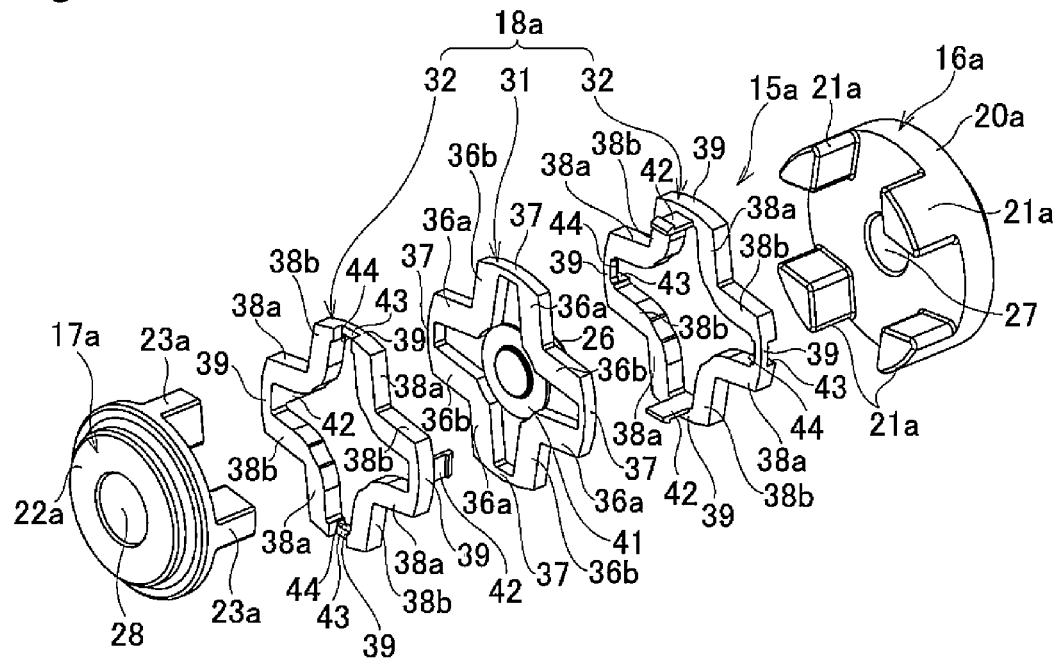
FIG. 5 is an exploded perspective view of the torque-transmission joint illustrated in FIG. 2 as seen from a different direction from FIG. 4.

FIG. 1 to FIG. 16 illustrate a first example of an embodiment of the present invention. The electric power steering apparatus of this example also basically has: a housing 3 that is supported by a fixed portion of a vehicle (vehicle body or portion fastened to the vehicle body) so as not to rotate; a steering shaft 2 that is provided so as to be able to rotate freely with respect to the housing 3 and that is a rotating sheering shaft that is rotated by operating a steering wheel 1 and that applies a steering angle to steered wheels according to the rotation; a worm 5 that has a worm wheel 4 that is concentrically supported inside the housing 3 by part of the steering shaft 2 and that rotates together with the steering shaft 2, a worm shaft 6a and worm teeth 7 that are provided around the middle section in the axial direction of the worm shaft 6a such that in a state in which the worm teeth 7 are engaged with the worm wheel 4, both end sections in the axial direction of the worm shaft 6a are supported by bearings 9a, 9b so as to be able to rotate freely with respect to the housing 3; and an electric motor 8 for rotating and driving the worm 5; with the output shaft 12a of the electric motor 8 being connected to the worm shaft 6a by a torque-transmission joint 15a such that torque can be transmitted. Except for the torque-transmission joint 15a, the construction of this example is basically the same as the conventional construction, so an explanation thereof is omitted, and below, the construction and operation of the torque-transmission joint 15a will be explained.

The torque-transmission joint 15a is a joint for transmitting torque between the output shaft 12 which is a driving shaft and the worm shaft 6a which is a driven shaft, that are arranged in series in the axial direction. The torque-transmission joint 15a has: a driving-side transmission member 16a that is concentrically supported by the tip-end section of the output shaft 12a such that relative rotation is not possible; a driven-side transmission member 17a that is concentrically supported by the base-end section of the worm shaft 6a such that relative rotation is not possible; and a shock-absorbing member 18a that is made using an elastic material and that is provided between the driving-side transmission member 16a and the driven-side transmission member 17a.

The driving-side transmission member 16a is made of metal, and has: a driving-side base section 20a that is supported by the tip-end section of the output shaft 12a; and four driving-side arm sections 21a that are intermittently provided in the circumferential direction at portions near the outer diameter on a surface of the driving-side base section 20a that faces the driven-side transmission member 17a and protrude out in the axial direction therefrom. A driving-side serration hole 27 is formed in the center section of the driving-side base section 20a, and this driving-side serration hole 27 makes a serration fit with male serrations that are formed around the outer-circumferential surface of the tip-end section of the output shaft 12a. In this example, the driving-side arm sections 21a are arranged so as to be evenly spaced at a phase of 90 degrees with an open space between adjacent driving-side arm sections 21a. However, as long as there are plural driving-side arm sections 21a, the number is arbitrary, and preferably is three or four.

The driven-side transmission member 17a is made of metal, and has: a driven-side base section 22a that is supported by the base-end section of the worm shaft 6a; and four driven-side arm sections 23a that are intermittently provided in the circumferential direction at portions on a surface of the driven-side base section 22a that faces the driving-side transmission member 16a and protrude in the axial direction therefrom. A driven-side serration hole 28 is formed in the center section of the driven-side base section 22a, and this driven-side serration hole 28 makes a serration fit with male serrations that are formed around the outer-circumferential surface of the base-end section of the worm shaft 6a. The driven-side arm sections 23a are also arranged so as to be evenly spaced at a phase of 90 degrees with an open space between adjacent driven-side arm sections 23a. However, as long as there are plural driven-side arm sections 23a, the number is arbitrary, and preferably is three or four, and is the same number as the number of driving-side arm sections 21a. The dimension in the axial direction of the driven-side arm sections 23a is the same as the dimension in the axial direction of the driving-side arm sections 21a. The driving-side transmission member 16a and the driven-side transmission member 17a are put together so that, when the surface on which the driving-side arm sections 21a are provided faces the surface on which the driven-side arm sections 23a are provided, the driving-side arm sections 21a and the driven-side arm sections 23a are arranged in an alternating manner in the circumferential direction.

In this example, a pair of side surfaces 29a, 29b in the circumferential surface of the driving-side arm sections 21a that corresponds to one of the driving-side arm sections 21a and driven-side arm sections 23a are inclined with respect to the radial direction instead of being arranged in the radial direction as in the conventional construction. More specifically, when the direction of rotation of the output shaft 12a is the clockwise direction in FIG. 6, the side surfaces 29a in the circumferential direction that are on the front side in the direction of rotation (one side) are inclined with respect to the radial direction in a direction toward the front in the direction of rotation while going toward the outside in the radial direction (direction toward the rear in the direction of rotation while going toward the inside in the radial direction). On the other hand, when the direction of rotation of the output shaft 12a is the counterclockwise direction in FIG. 6, the side surfaces 29b in the circumferential direction that are on the front side in the direction of rotation (other side) are inclined with respect to the radial direction in a direction toward the front in the direction of rotation while going toward the outside in the radial direction (direction toward the rear in the direction of rotation while going toward the inside in the radial direction). Moreover, the angle between the pair of side surfaces 29a, 29b in the circumferential direction of the driving-side arm sections 21a is 90 degrees or more (approximately 110 degree in the example in the figures).

The pair of side surfaces 30a, 30b in the circumferential direction of the driven-side arm sections 23a, which correspond to the other of the driving-side arm sections 21a and driven-side arm sections 23a, are also inclined with respect to the radial direction instead of being arranged in the radial direction as in the conventional construction. More specifically, when the direction of rotation of the output shaft 12a is the clockwise direction in FIG. 6, the side surfaces 30a in the circumferential direction that are on the front side in the direction of rotation (one side) are inclined with respect to the radial direction in a direction toward the rear in the direction of rotation while going toward the outside in the radial direction. On the other hand, when the direction of rotation of the output shaft 12a is the counterclockwise direction in FIG. 6, the side surfaces 30b in the circumferential direction that are on the front side in the direction of rotation (other side) are inclined with respect to the radial direction in a direction toward the rear in the direction of rotation while going toward the outside in the radial direction. Therefore, the space in the circumferential direction between the pair of side surfaces 30a, 30b in the circumferential direction of the driven-side arm sections 23 becomes smaller (is tapered) going toward the outside in the radial direction.

The shock-absorbing member 18a is constructed by putting three cross-shaped shock-absorbing pieces 31, 32 (one inside shock-absorbing piece 31 and two outside shock-absorbing pieces 32) together in the axial direction, and has a total of eight held sections 33a, 33b and four outer-diameter side cover sections 34.

Each of the held sections 33a, 33b have an overall flat plate shape of which the thickness in the circumferential direction essentially does not change in the radial direction, and are located between the side surfaces in the circumferential direction of driving-side arm sections 21a and driven-side arm sections 23a that are adjacent in the circumferential direction. Particularly, in this example, pairs of held sections 33a, 33b that are adjacent in the circumferential direction are mirror symmetrical about virtual planes (planes on the chain lines α, β, γ, δ in FIG. 9) that includes the center axis of the shock-absorbing member 18a, and are inclined toward each other going toward the outside in the radial direction, and in a direction toward the virtual planes with respect to the radial direction. In other words, the held sections 33a, 33b are inclined with respect to the radial direction instead of being arranged in the radial direction as in the conventional construction. The directions of inclination of the pair of held sections 33a, 33b are opposite each other, and the angles of inclination are the same. In this example, as sets, the pairs of held sections 33a, 33b having this kind of construction form combined held sections 35, such that there are four combined held sections 35 that are uniformly spaced in the circumferential direction.

Each of the combined held sections 35, has an outer-diameter side cover section 34 in addition to the pair of held sections 33a, 33b. More specifically, the outer-diameter side cover sections 34 are such that the outer-circumferential shape is a partial cylindrical shape, and of the held sections 33a, 33b that are adjacent in the circumferential direction, these outer-diameter side cover sections 34 connect the outer-diameter side end sections of the pair of the held sections 33a, 33b that constitute a combined held section 35. On the other hand, of the held sections 33a, 33b that are adjacent in the circumferential direction, the inner-diameter end sections of held sections 33a, 33b that are adjacent in the circumferential direction but that are of different combined held sections 35 and are not a pair are directly connected. As a result, the portions where the outer-diameter end section of held sections 33a, 33b that are adjacent in the circumferential direction are covered by outer-diameter side cover sections 34, and the portions where the inner-diameter ends of held sections 33a, 33b that are adjacent in the circumferential direction are directly connected are arranged in an alternating manner in the circumferential direction. With this kind of construction, the shock-absorbing member 18a is formed into a non-circular cross-like tubular shape. Between adjacent combined held sections 35, it is also possible to connect the inner-diameter side end sections of the held sections 33a, 33g of adjacent combined held sections that are not a pair of held sections 33a, 33g that constitute a combined held section 35 with an inner-diameter side cover section. Moreover, the pair of held sections 33a, 33b of a combined held section 35 have the same angle of inclination with respect to the radial direction, however the direction of inclination is opposite. Furthermore, the number of combined held sections 35 is arbitrary, however, preferably, the combined held sections 35 are arranged at three or four locations that are uniformly spaced in the circumferential direction so as to correspond to the driving-side arm sections 21a and driven-side arm sections 23a. Particularly, as in this example, it is preferred that the combined held sections 35 be uniformly spaced in the circumferential direction at four locations, such that the shock-absorbing member 18a has a cross-like tubular shape.

In this example, of the three shock-absorbing pieces 31, 32 of the shock-absorbing member 18a, the inside shock-absorbing piece 31 that is located in the center in the axial direction is made using a material that elastically deforms more easily than the outside shock-absorbing pieces 32 that are located on both sides in the axial direction. More specifically, the inside shock-absorbing piece 31 is made using a material that elastically deforms easily such as rubber or an elastomer, and the outside shock-absorbing pieces 32 are made using a synthetic resin such as polyacetal resin or polyamide resin that does not elastically deform as easily as rubber or an elastomer.

The inside shock-absorbing piece 31, when assembled in the shock-absorbing member 18a, has inside held pieces 36a, 36b that constitute part of the held sections 33a, 33b, and inside cover pieces 37 that constitute part of the outer-diameter side cover sections 34. The outside shock absorbing pieces 32, when assembled in the shock-absorbing member 18a, also have outside held pieces 38a, 38b that constitute part of the held sections 33a, 33b, and outside cover pieces 39 that constitute part of the outer-diameter side cover section 34. Therefore, the held sections 33a, 33b of the shock-absorbing member 18a are constructed by layering the inside held pieces 36a, 36b and outside held pieces 38a, 38b in the axial direction, and the outer-diameter side cover sections are constructed by layering the inside cover pieces 37 and outside cover pieces 39 in the axial direction.

The width dimension (width dimension in the circumferential direction) of the inside held pieces 36a, 36b of the inside shock-absorbing piece 31 is greater than the width dimension (width dimension in the circumferential direction) of the outside held pieces 38a, 38b of the outside shock-absorbing pieces 32. As a result, when the shock-absorbing member 18a is assembled, both side surfaces in the circumferential direction of the inside held pieces 36a, 36b protrude in the circumferential direction further than both side surfaces in the circumferential direction of the outside held pieces 38a, 38b, so that bulging sections 40a, 40b are formed by the portions where the inside held pieces 36a, 36b protrude. When the shock-absorbing member 18a, the driving-side arm sections 21a and the driven-side arm sections 23a are assembled, the bulging sections 40a, 40b are elastically squashed a little between the side surfaces 29a, 29b in the circumferential direction of the driving-side arm sections 21a and the side surfaces 30a, 30b in the circumferential direction of the driven-side arm sections 23a. In this example, the width dimension (amount of protrusion) of the bulging sections 40a, 40b is constant over the lengthwise direction of the held sections 33a, 33b.

Particularly, in this example, a damper section 26 is integrally provided in the inside shock-absorbing piece 31. The damper section 26 is constructed by a solid body having a circular column shape, and is integrally provided on the inside of the inside shock-absorbing piece 31 by four locations that are uniformly spaced in the circumferential direction of a thin ring-shaped connecting section 41 that is formed around the outer-circumferential surface of the portion near the other end in the axial direction of the damper section 26 connecting with connecting sections of inner-diameter side end sections of the inside held pieces 36a, 36b. The damper section 26 is formed such that one end section in the axial direction protrudes from the side surface in the axial direction of the inside shock-absorbing piece 31, and when the shock-absorbing member 18a is assembled, greatly protrudes to the outside in the axial direction further than the side surface in the axial direction of the shock-absorbing member 18a. The integrally constructed inside shock-absorbing piece 31 and damper section 26 are simultaneously formed by injection molding. In this example, the surfaces on both ends in the axial direction of the damper section 26 are flat surfaces.

As described above, in order to improve the ease of assembly and handling of the shock-absorbing member 18a that has three shock-absorbing pieces 31, 32, the inside shock-absorbing piece 31 and the outside shock-absorbing pieces 32 are connected by snap-fit joint construction such that pieces can be disconnected. More specifically, hook-shaped or clasp-shaped fastening tabs 42, which correspond to engaging sections, and concave engaging sections 43, which correspond to engaged sections, are formed in an alternating manner in the circumferential direction on the four outside cover pieces 39 of the outside shock-absorbing pieces 32.

The fastening tabs 42 are formed on the inner-diameter side end section of the surface on one side in the axial direction of the outside cover pieces 39, and protrude out in the axial direction therefrom. The tip-end sections of the fastening tabs 42 bend toward the outside in the radial direction. On the other hand, the concave engaging sections 43 are formed in the radial direction on the other side surface in the axial direction of the outside cover pieces 38, and are concave in the axial direction. Of these outside cover pieces 39, concave groove 44 are formed on the inner-circumferential surface of the outside cover pieces 39 where the concave engaging sections 43 are formed on the surface on the other side in the axial direction, and are for the fastening tabs 42 to pass through.

In order to join the inside shock-absorbing piece 31 with the outside shock-absorbing pieces 32, side surfaces in the axial direction of the outside shock-absorbing pieces 32 are made to face both sides in the axial direction of the inside shock-absorbing piece 31, and outside shock-absorbing pieces 32 are arranged such that the phases of the outside shock-absorbing pieces 32 are shifted 90 degrees from each other. As a result, the fastening tabs 42 and the concave engaging sections 43 (concave grooves 44) are arranged on the same virtual lines at four locations in the circumferential direction. By bringing the outside shock-absorbing pieces 32 close to each other, the fastening tabs 42 are elastically deformed in the radial direction while sequentially being passed through the inside in the radial direction of the inside cover pieces 37 of the inside shock-absorbing piece 31 and the inside of the concave grooves 44. Then, with the inside shock-absorbing piece 31 elastically deformed a little in the axial direction, the fastening tabs 42 elastically return outward in the radial direction, and the tip-end sections of these fastening tabs 42 are elastically engaged with the concave engaging sections 43. In this example, the shock-absorbing member 18a is formed by joining the inside shock-absorbing piece 31 and the outside shock-absorbing pieces 32 together using this kind of snap-fit joint structure.

In this example, the shock-absorbing member 18a is constructed by three shock-absorbing pieces 31, 32, however, the present invention is not limited to this kind of construction, and it is also possible to construct the shock-absorbing member using two shock-absorbing pieces or an arbitrary number of shock-absorbing pieces such as three or more. Moreover, it is possible to make all of the shock-absorbing pieces of the shock-absorbing member using the same material, or all of the shock-absorbing pieces can be made using different materials. Furthermore, in the present invention, it is also possible to integrally construct the shock-absorbing member as one member without comprising plural shock-absorbing pieces.

Figure 6:
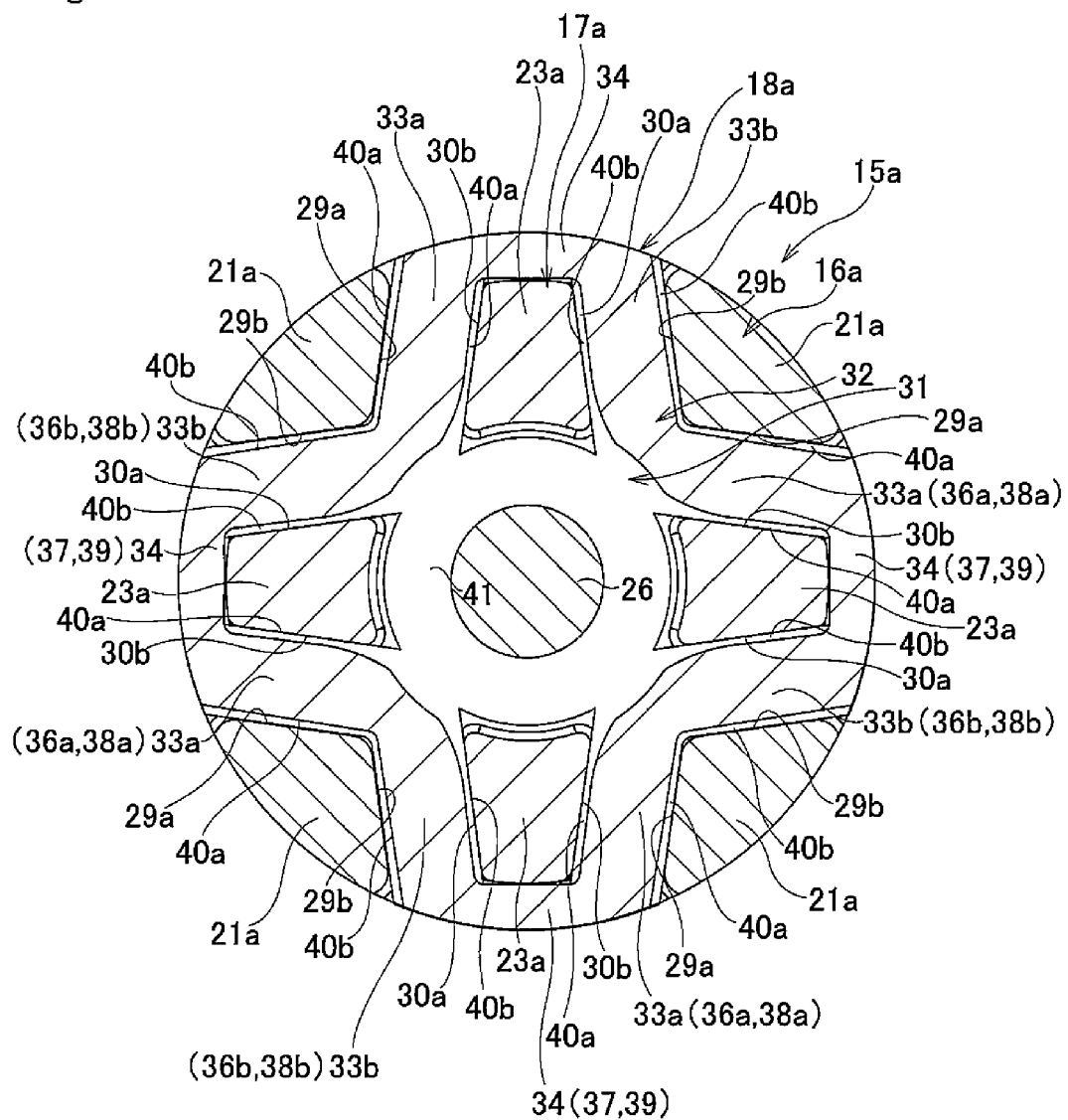
FIG. 6 is an enlarged cross-sectional view of section A-A in FIG. 1 of the torque-transmission joint illustrated in FIG. 2.
Figure 7:
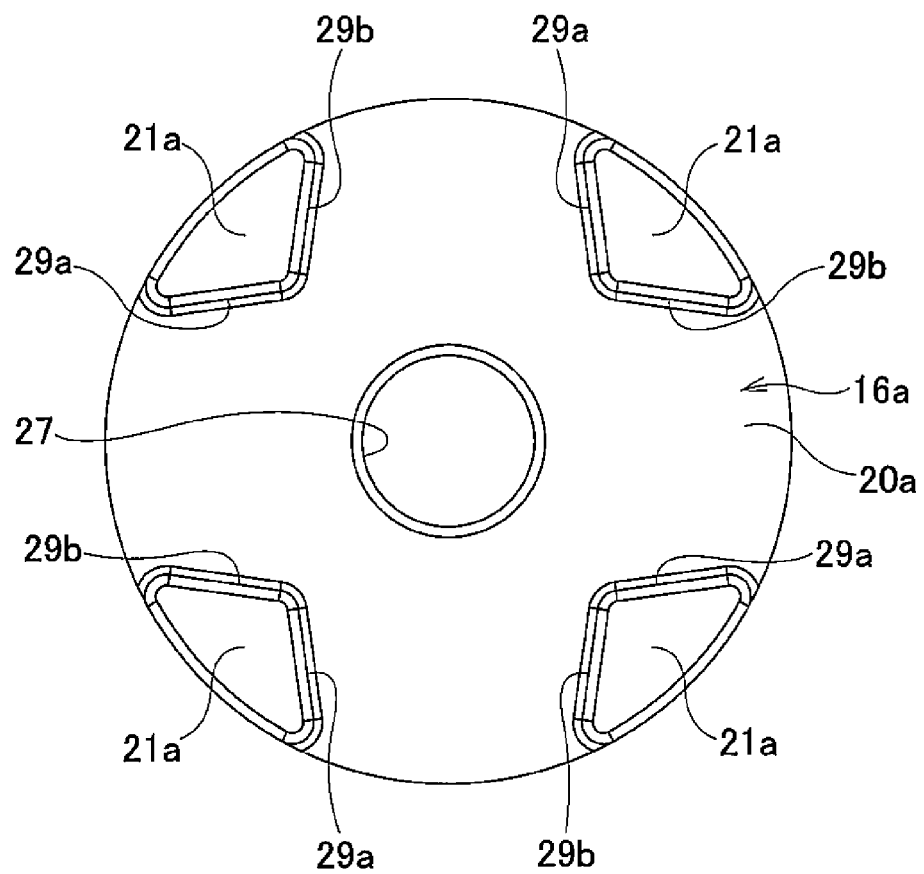
FIG. 7 is a view of the driving-side transmission member of the torque-transmission joint illustrated in FIG. 2 as seen from the tip-end side of the driving-side arm sections.
Figure 8:
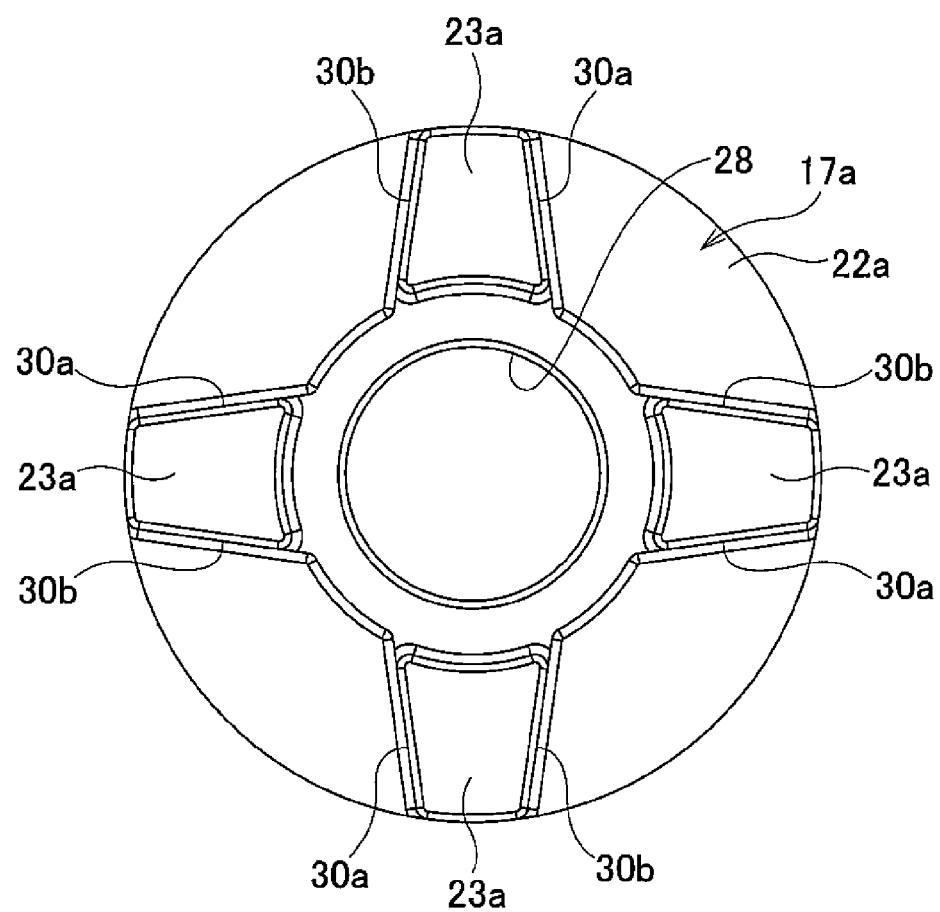
FIG. 8 is a view of the driven-side transmission member of the torque-transmission joint illustrated in FIG. 2 as seen from the tip-end side of the driven-side arm sections.
Figure 9:
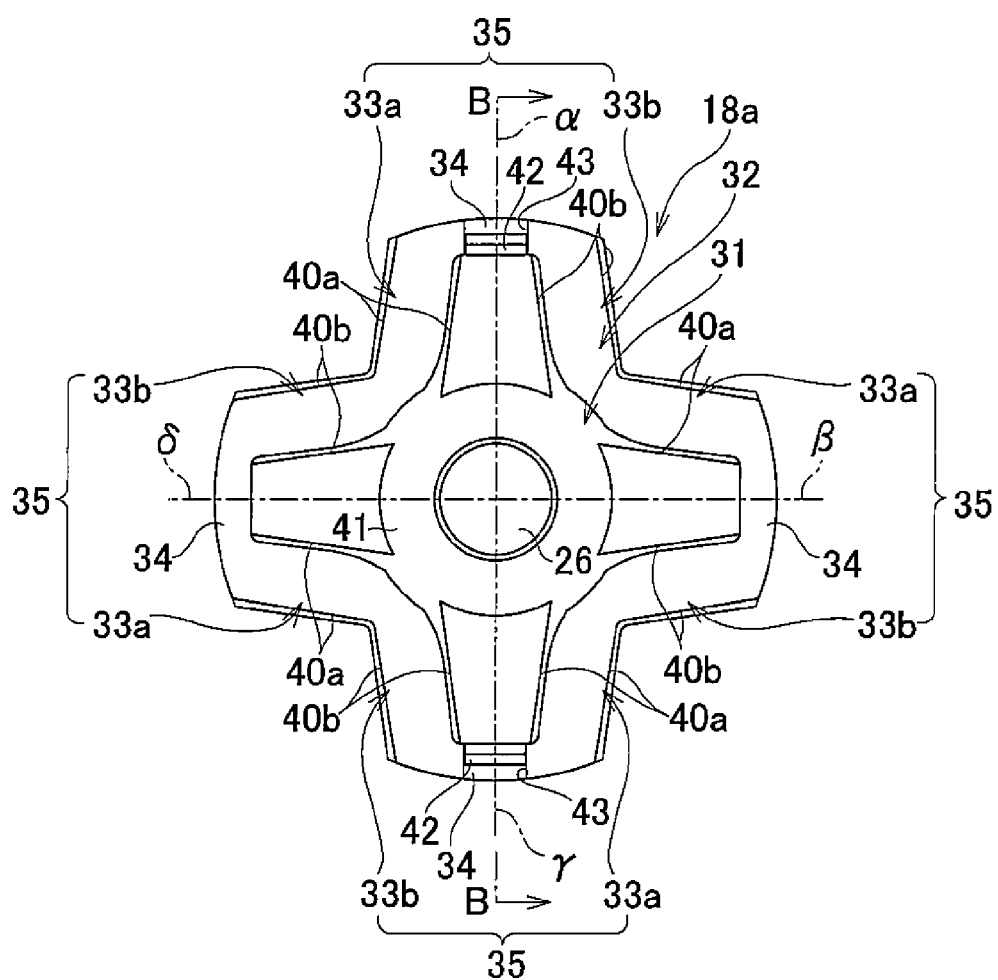
FIG. 9 is an end view of the shock-absorbing member of the torque-transmission joint illustrated in FIG. 2.
Figure 10:
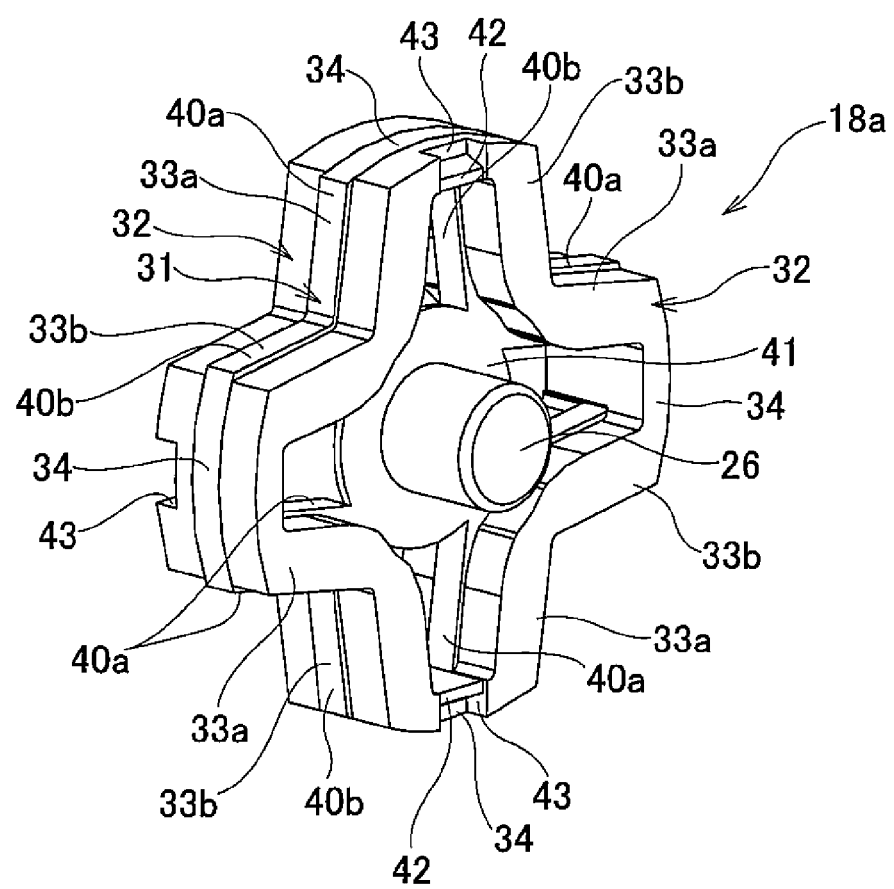
FIG. 10 is a perspective view of the shock-absorbing member illustrated in FIG. 9.
Figure 11:
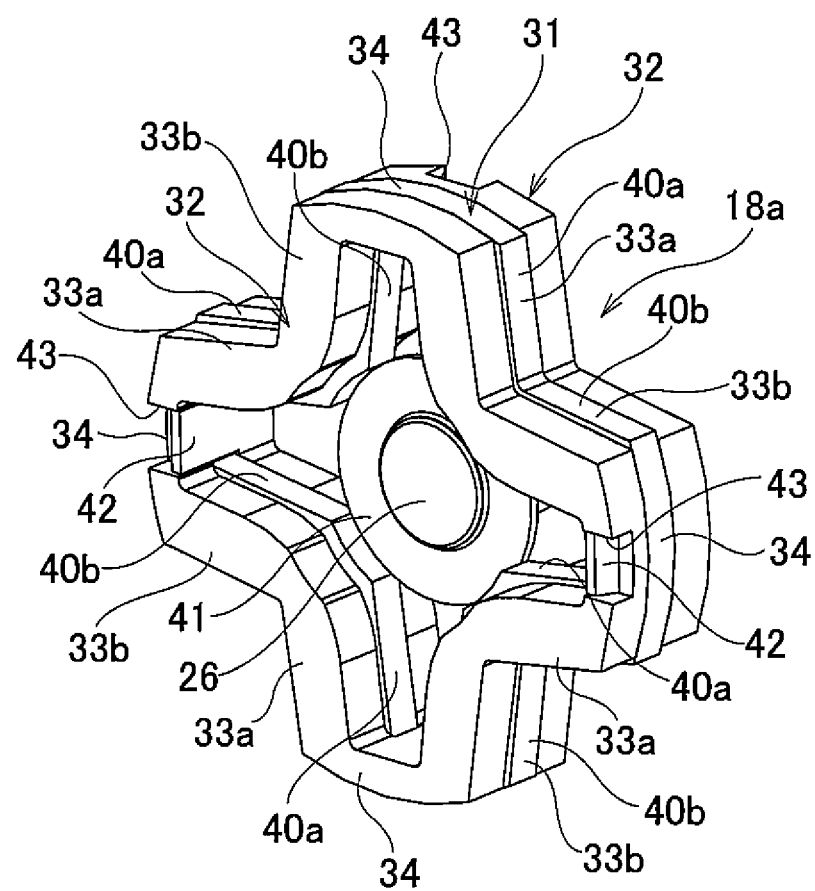
FIG. 11 is a perspective view of the shock-absorbing member illustrated in FIG. 9 as seen from a different direction from FIG. 10.
Figure 12:
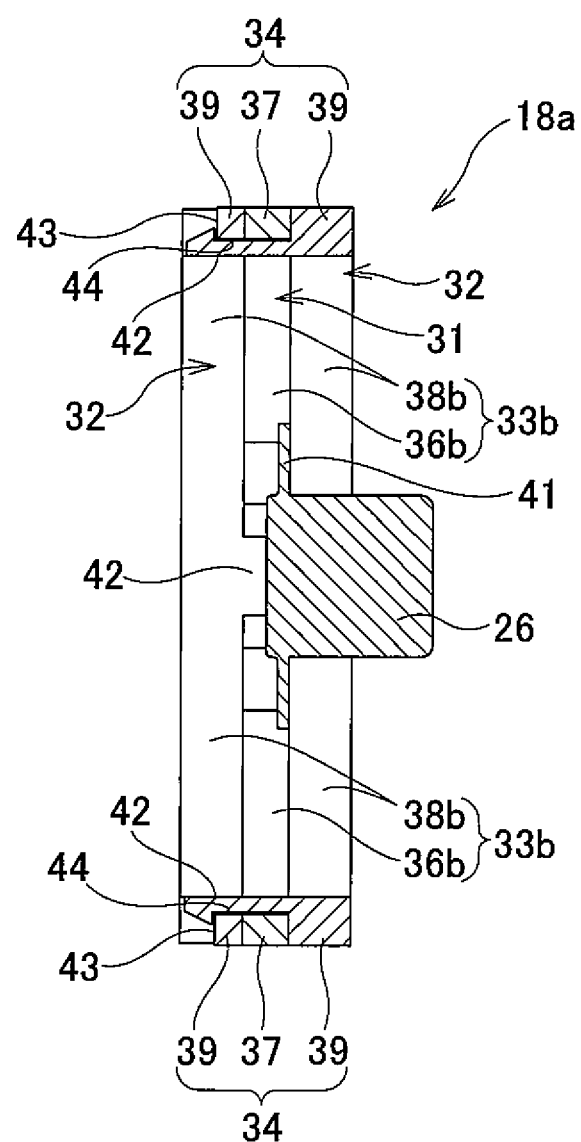
FIG. 12 is a cross-sectional view of section B-B in FIG. 9.
Figure 13:
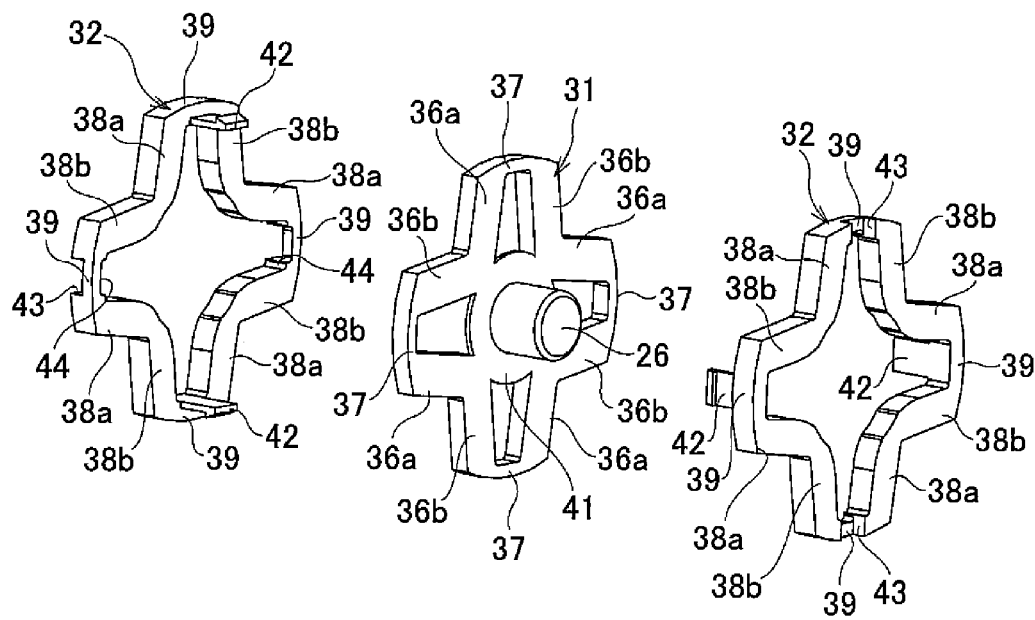
FIG. 13 is an exploded perspective view of the shock-absorbing member illustrated in FIG. 9.
Figure 14:
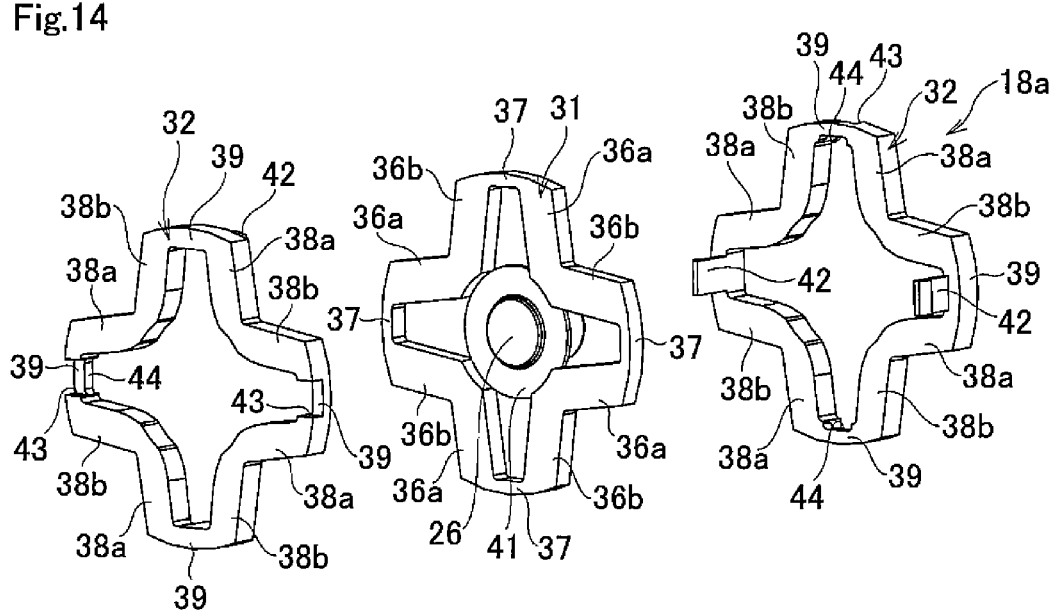
FIG. 14 is an exploded perspective view of the shock-absorbing member illustrated in FIG. 9 as seen from a different direction from FIG. 13.
Figure 15:
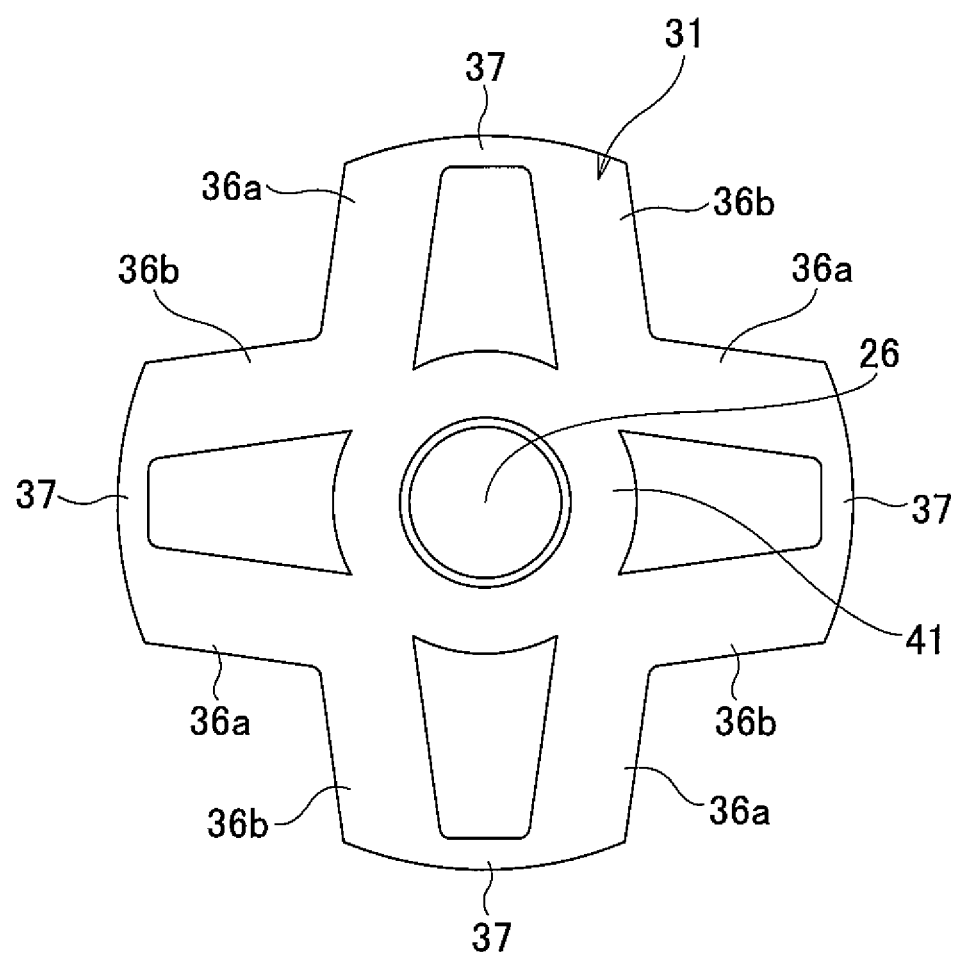
FIG. 15 is an end view of the inside shock-absorbing piece of the shock-absorbing member illustrated in FIG. 9.
Figure 16:
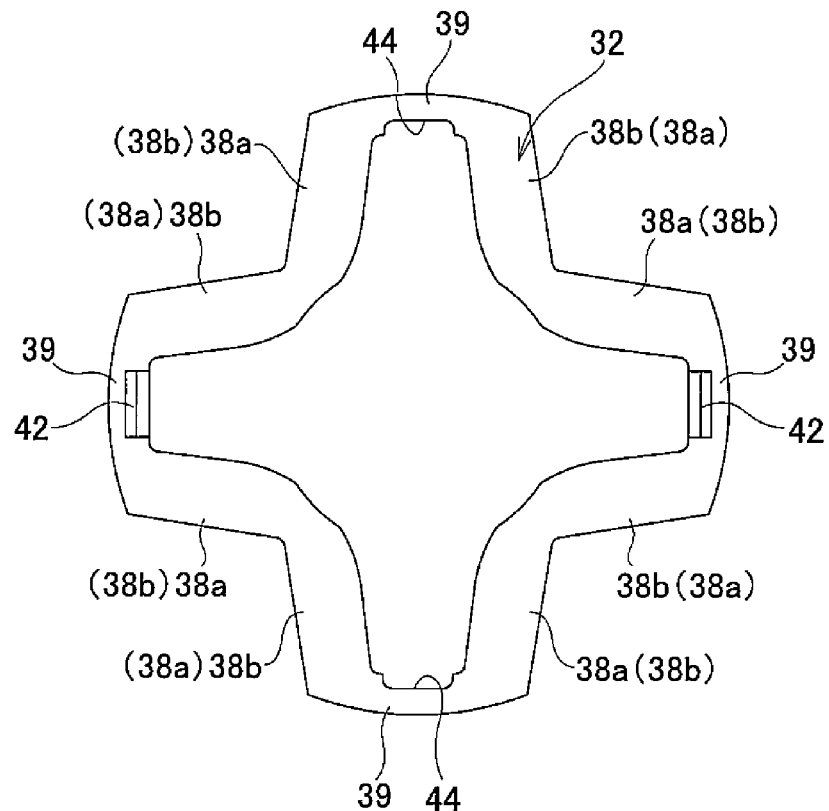
FIG. 16 is an end view of an outside shock-absorbing piece of the shock-absorbing member illustrated in FIG. 9.
Figure 17:
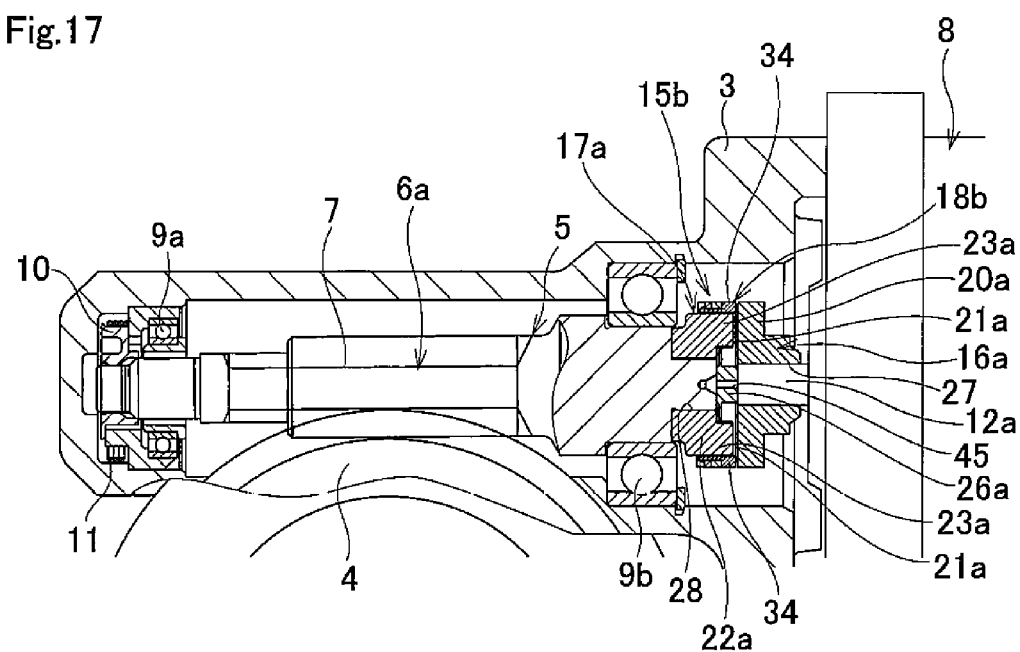
FIG. 17 is a view corresponding to FIG. 1, and illustrates a second example of an embodiment of the present invention.
Figure 18:
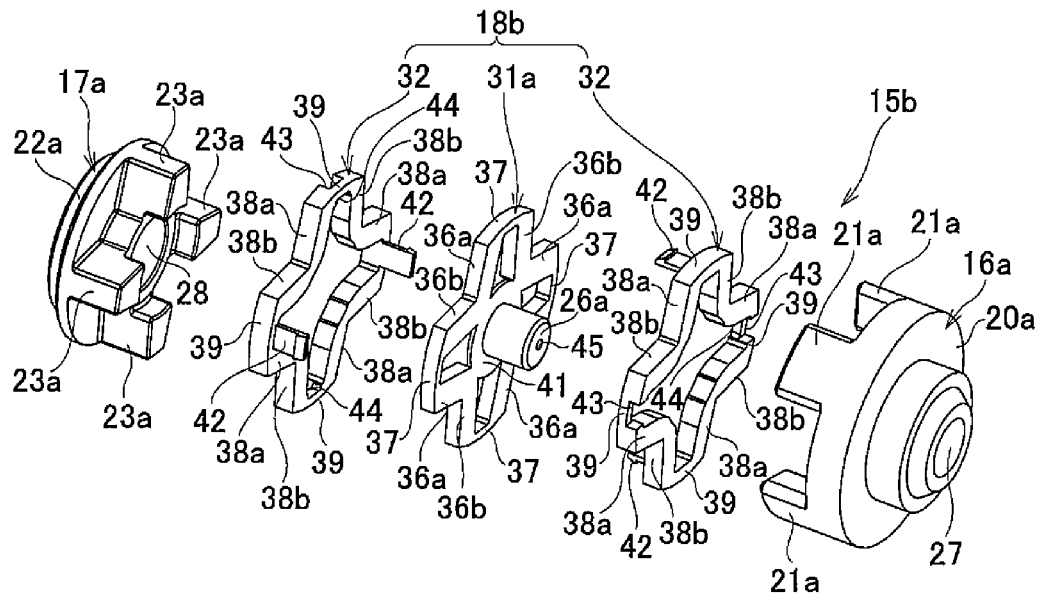
FIG. 18 is an exploded perspective view of the torque-transmission joint of a second example of an embodiment of the present invention.
Figure 19:
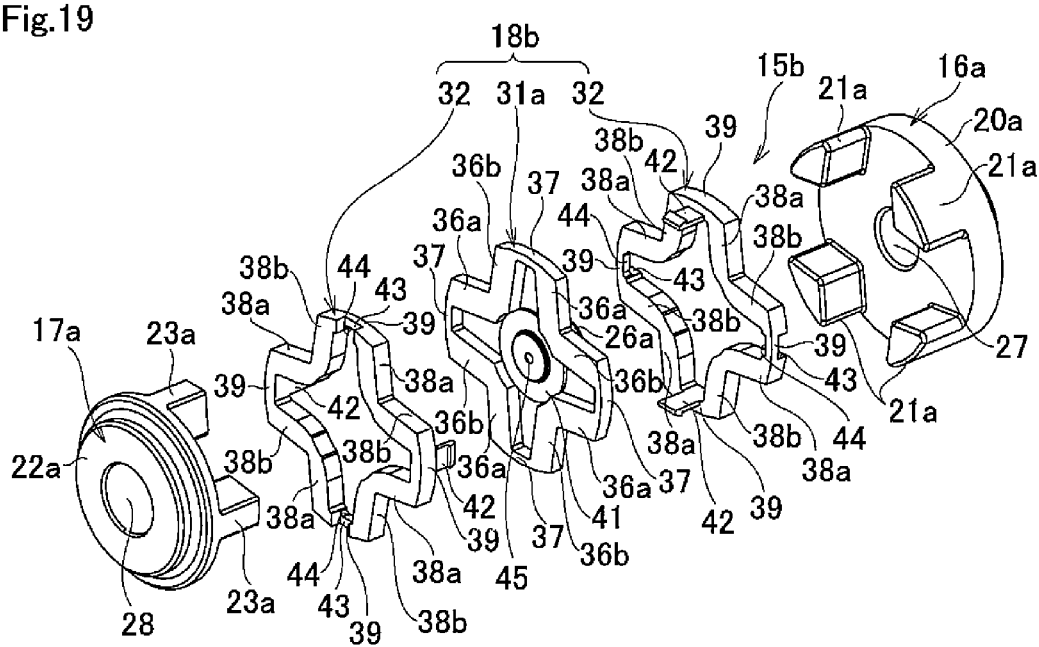
FIG. 19 is an exploded perspective view illustrating the torque-transmission joint illustrated in FIG. 18 as seen from a different direction from FIG. 18.
Figure 20:
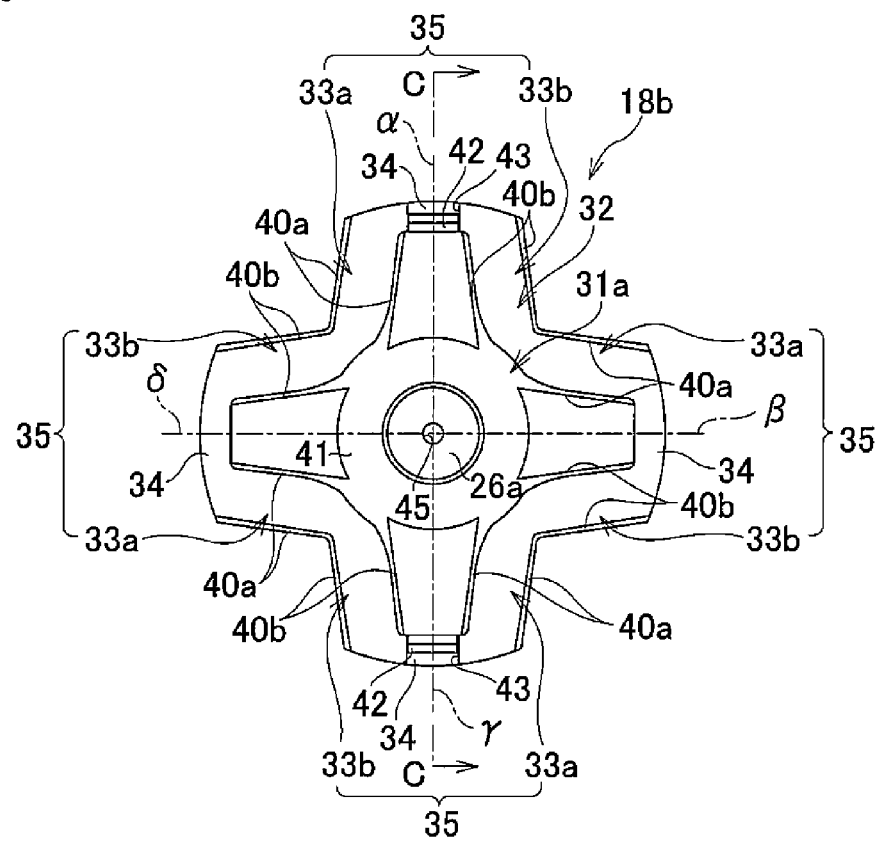
FIG. 20 is an end view of the shock-absorbing member of the torque-transmission joint illustrated in FIG. 18.
Figure 21:
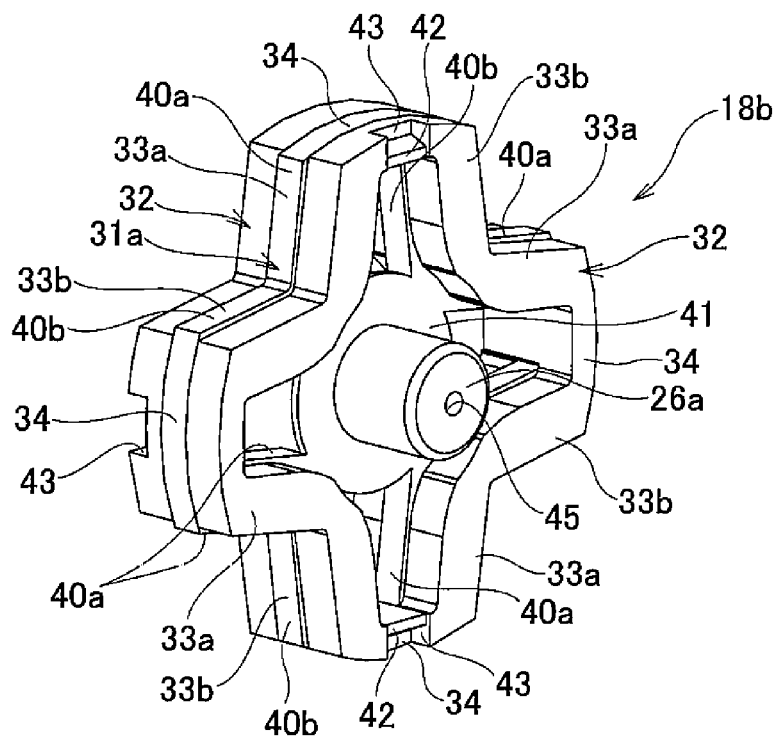
FIG. 21 is a perspective view of the shock-absorbing member illustrated in FIG. 20.
Figure 22:
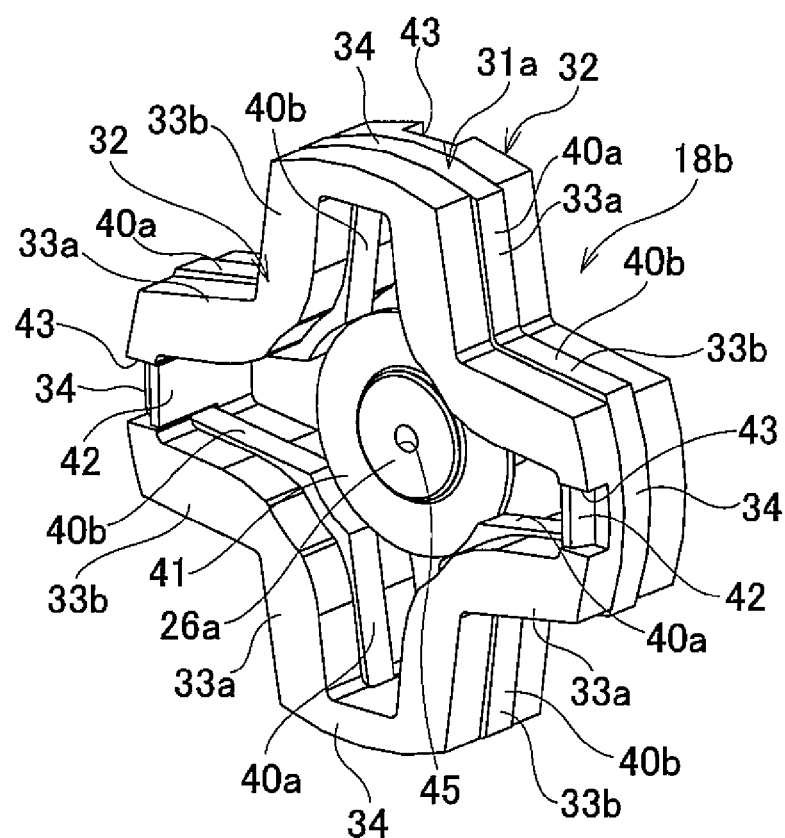
FIG. 22 is a perspective view of the shock-absorbing member illustrated in FIG. 20 as seen from a different direction from FIG. 21.
Figure 23:
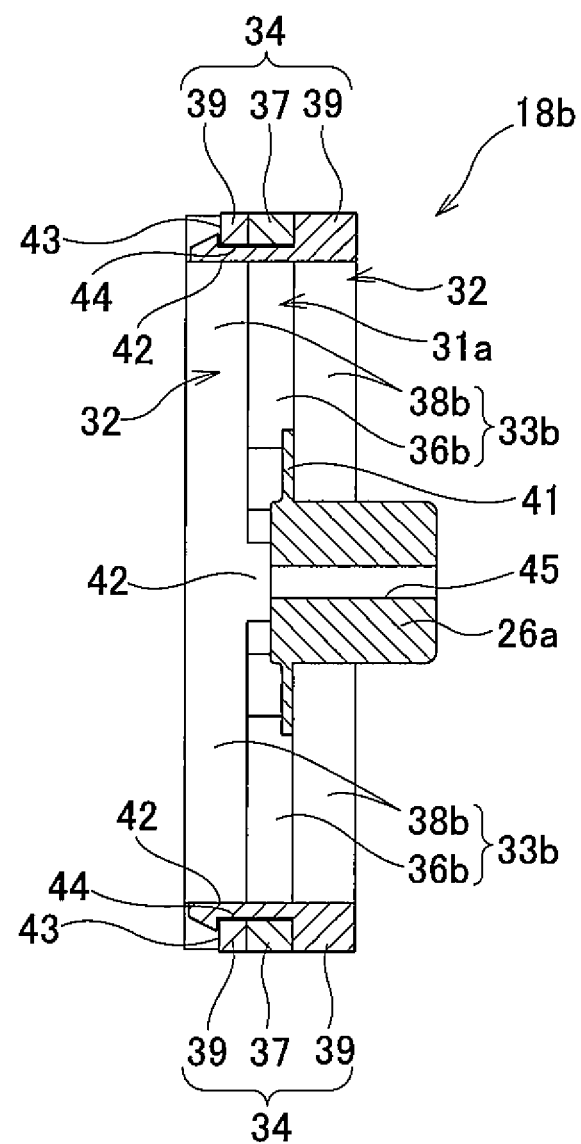
FIG. 23 is a cross-sectional view of section C-C in FIG. 20.
Figure 24:
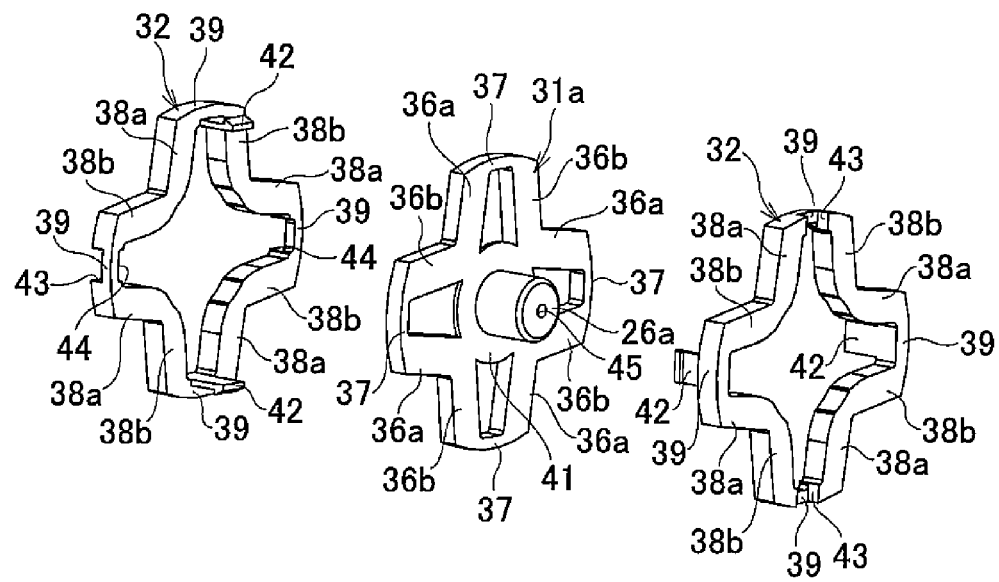
FIG. 24 is an exploded perspective view of the shock-absorbing member illustrated in FIG. 20.
Figure 25:
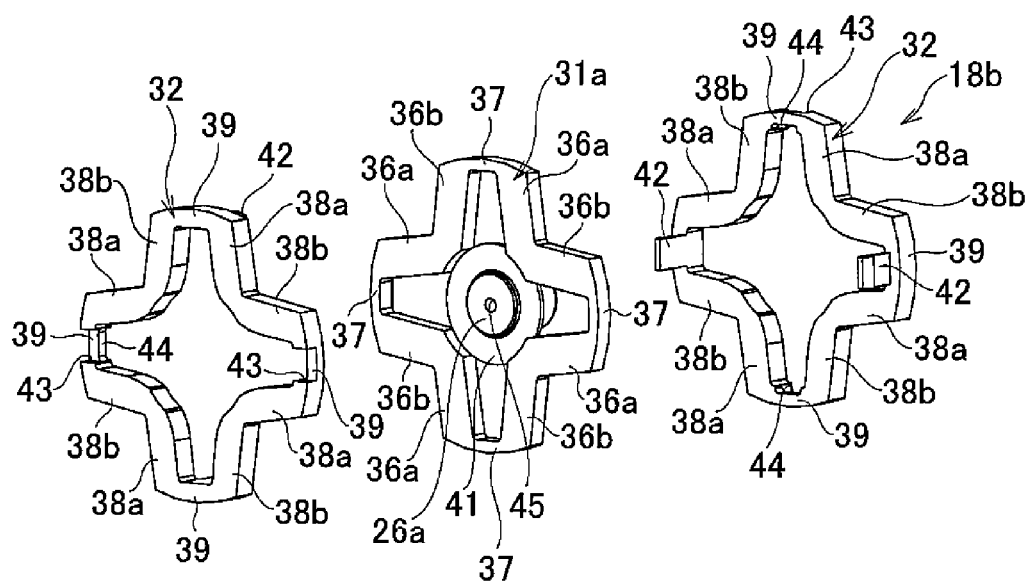
FIG. 25 is an exploded perspective view of the shock-absorbing member illustrated in FIG. 20 as seen from a different direction from FIG. 24.

The shock-absorbing member 18a that was assembled as described above, the driving-side arm sections 21a and the driven-side arm sections 23a are assembled as described below. In other words, as illustrated in FIG. 6, the driven-side arm sections 23a, which correspond to the other arm sections, are arranged in the outside portion in the radial direction of the ring-shaped connecting section 41 between the pairs of held sections 33a, 33b of the combined held sections 35. Moreover, the driving-side arm sections 21a, which correspond to the one arm sections, are arranged between the combined held sections 35 that are adjacent in the circumferential direction (the held sections 33a, 33b of different combined held sections 35 of the pairs of held sections 33a, 33b that are adjacent in the circumferential direction). As a result, the outer-circumferential side surfaces of the driven-side arm sections 23a are covered by the outer-diameter side cover sections 34 of the shock-absorbing member 18a. In this state, the pairs of side surfaces 29a, 29b in the circumferential direction of the driving-side arm sections 21a, and the pairs of side surfaces 30a, 30b in the circumferential direction of the driven-side arm sections 23a come in contact over the entire surface with the side surfaces in the circumferential direction of the held sections 33a, 33b that face these surfaces in the circumferential direction. As a result, the bulging sections 40a, 40b are elastically squashed a little.

As illustrated in FIG. 1, when the output shaft 12a of the electric motor 8 and the worm shaft 6a are connected using the torque-transmission joint 15a of this example, the damper section 26 is held on both sides in the axial direction between the tip-end surface of the output shaft 12a and the base-end surface of the worm shaft 6a in an elastically deformed state, or more specifically, in an elastically compressed state.

In the case of the torque-transmission joint 15a and electric power steering apparatus of this example having construction such as described above, it is possible to absorb thrust force that is transmitted between the output shaft 12a and the worm shaft 6a, and it is possible to prevent the occurrence of noise due to relative displacement between the worm shaft 6a and the output shaft 12a. Moreover, with the construction of this example, the visibility of the shock-absorbing member 18a from the outside is improved, and it is possible to effectively absorb errors such as dimensional errors or assembly errors of the components of the electric power steering apparatus and torque-transmission joint 15a.

More specifically, a damper section 26 that is made using a material that elastically deforms easily and that is integrally provided with the inside shock-absorbing piece 31 is held between the tip-end surface of the output shaft 12a and the base-end surface of the worm shaft 6a, so even when the worm shaft 6a moves in the axial direction with respect to the output shaft 12a as the electric motor 8 operates, the occurrence of noise due to impact is prevented. Particularly, in the case of this example, a damper section 26 is held between the tip-end surface of the output shaft 12a and the base-end surface of the worm shaft 6a in a state of being elastically deformed in the axial direction, so the worm shaft 6a can be pressed in the opposite direction in the axial direction from the output shaft 12a, and a preload can be applied to the worm shaft 6a. Therefore, even when thrust force is applied to the worm shaft 6a in opposite directions in the axial direction during forward operation and reverse operation of the electric motor 8, it is possible to effectively suppress movement or backlash in the axial direction of the worm shaft 6a. Moreover, by the damper section 26 elastically deforming, part of the thrust force that is transmitted between the worm shaft 6a and the output shaft 12a is absorbed or reduced, and it is possible to transmit the remaining thrust force. Therefore, the thrust force that is transmitted between the worm shaft 6a and the output shaft 12a is prevented from becoming excessively large. Furthermore, by the ring-shaped connecting section 41 deforming or bending in the axial direction as the damper section 26 elastically deforms in the axial direction, the transmission of thrust force to portions other than the damper section 26 of the inside shock-absorbing piece 31 of the shock-absorbing member 18a is effectively prevented, so it is possible to maintain the durability of the shock-absorbing member 18a over a long period of time. In addition, when compared with the case of providing a member for absorbing thrust force that is separate and independent from the shock-absorbing member 18a, it is possible to reduce costs by reducing the number of parts, and reducing the manufacturing work and assembly work. Furthermore, the installation position of the damper section 26 can be regulated by way of the shock-absorbing member 18a (inside shock-absorbing piece 31), so it is possible to stabilize the function for absorbing thrust force by the damper section 26.

In this example, the outer-diameter side cover sections 34 of the combined held sections 35 of the shock-absorbing member 18a cover the surfaces on the outer-circumferential side of the driven-side arm sections 23a, so in the assembled state of the torque-transmission joint 15a, the surface area of the portion of the shock-absorbing member 18a that is exposed to the outside is sufficiently large, and thus visibility of the shock-absorbing member 18a from the outside can be improved. As a result, it becomes easier to visually check the shock-absorbing member 18a, so it is possible to improve the work efficiency of the inspection process for preventing assembly of the shock-absorbing member 18a from being forgotten. Moreover, it becomes easier to align the output shaft 12, which is the driving shaft, and the worm shaft 6, which is the driven shaft. Furthermore, by the outer-diameter side cover sections 34 of the shock-absorbing member 18a being exposed to the outside, it becomes easier to absorb assembly error such as deviation from the center axis of the output shaft 12, which is the driving shaft, and the worm shaft 6, which is the driven shaft.

In this example, when the output shaft 12a of the electric motor 8 is rotated and driven and torque begins to be transmitted, it is possible to cause a force in the inward radial direction of the shock-absorbing member 18a to act on the held sections 33a, 33b of the shock-absorbing member 18a that are held between the side surfaces 29a, 29b in the circumferential direction of the driving-side arm sections 21a and the side surfaces 30a, 30b in the circumferential direction of the driven-side arm sections 23a. In other words, when the output shaft 12a is rotated and driven in the clockwise direction in FIG. 6 and the transmission of torque begins, four held sections 33a of the shock-absorbing member 18a are held between the side surfaces 29a in the circumferential direction of the front side in the direction of rotation of the driving-side arm sections 21a, and the side surfaces 30b in the circumferential direction of the rear side in the direction of rotation of the driven-side arm sections 23a. When this happens, the side surfaces 29a in the circumferential direction of the driving-side arm sections 21a are inclined with respect to the radial direction in a direction toward the front in the direction of rotation while going toward the outside in the radial direction, and so the bulging sections 40a of the held sections 33a are gradually and elastically deformed and squashed in the circumferential direction from the outer-diameter side portion to the inner-diameter side portion. Then, a force in the inward radial direction of the shock-absorbing member 18a is applied to the held sections 33a.

On the other hand, when the output shaft 12a is rotated and driven in the counterclockwise direction in FIG. 6 and transmission of torque begins, four held sections 33b of the shock-absorbing member 18a are held between the side surfaces 29b in the circumferential direction on the front side in the direction of rotation of the driving-side arm sections 21a and the side surfaces 30a in the circumferential direction on the rear side in the direction of rotation of the driven-side arm sections 23a. When this happens, the side surfaces 29b in the circumferential direction of the driving-side arm sections 21a are inclined with respect to the radial direction in a direction toward the front in the direction of rotation while going toward the outside in the radial direction, and so the bulging sections 40b of the held sections 33b are gradually and elastically deformed and squashed in the circumferential direction from the outer-diameter side portion to the inner-diameter side portion. Then, a force in the inward radial direction of the shock-absorbing member 18a is applied to the held sections 33b.

Therefore, when the output shaft 12a is rotated and driven in the clockwise direction in FIG. 6, the portions near the inner-diameter side end section of the held sections 33a is bent in the inward radial direction, making it possible to obtain a weakened binding force. On the other hand, when the output shaft 12a is rotated and driven in the counterclockwise direction in FIG. 6, the portions near the inner-diameter side end section of the held sections 33b are bent in the inward radial direction, making it possible to obtain a weakened binding force. In either case, the shock-absorbing member 18a can elastically deform more easily in the radial direction than in the case of conventional construction. Therefore, with the construction of this example, it is possible to sufficiently and effectively absorb error such as alignment error that occurs between the output shaft 12a and the worm shaft 6a, as well as dimensional error and assembly error of the components of the electric power steering apparatus. As a result, it is possible to improve the transmission efficiency of the overall system of the electric power steering apparatus.

In this example, when torque begins to be transmitted, first, the inside held pieces 36a, 36b of the inside shock-absorbing piece 31 that is located in the center in the axial direction and made from a material that elastically deforms easily are held between the side surfaces 29a, 29b in the circumferential direction of the driving-side arm sections 21b and the side surfaces 30a, 30b in the circumferential direction of the driven-side arm sections 23a, 23b. Then, after the bulging sections 40a, 40b of the inside held pieces 36a, 36b have been elastically deformed a specified amount, the outside held pieces 38a, 38b of the outside shock-absorbing pieces 32 that are arranged on both sides in the axial direction are held. In this way, in this example, the timing when the held pieces 36a, 36b, 38a, 38b of the inside shock-absorbing piece 31 and outside shock-absorbing pieces 32 are held is intentionally shifted so that the held pieces 36a, 36b that elastically deform easily are held first. As a result, it is possible to prevent excessive torque from being transmitted from the instant that transmission of torque begins, and it becomes possible to gently increase the transmission torque.

Furthermore, in the assembled state of the torque-transmission joint 15a, by causing the bulging sections 40a, 40b to elastically deform a little in the circumferential direction, the shock-absorbing member 18a can be installed so as to have interference with respect to the driving-side transmission member 16a and driven-side transmission member 17a. Therefore, the shock-absorbing member 18a is effectively prevented from backlash with respect to the driving-side transmission member 16a and driven-side transmission member 17a, and it becomes possible to stably transmit torque even at the start of operation or when the direction of rotation changes.

Moreover, the inside shock-absorbing piece 31 and outside shock-absorbing pieces 32 are joined with a snap-fit joint that uses fastening tabs 42 and concave engaging sections 43, so together with being able to easily assemble the shock-absorbing member 18a, it is possible to improve the ease of handling the shock-absorbing member 18a.

Second Example

FIG. 17 to FIG. 27C illustrate a second example of an embodiment of the present invention. A feature of this example is that a hollow hole 45 that is recessed in the axial direction from the end surface in the axial direction of a damper section 26a and that functions as a deformation adjustment section is formed in the damper section 26a that is integrally formed with an inside shock-absorbing piece 31a of a shock-absorbing member 18b. The construction and operational effect of the other parts are the same as in the first example of an embodiment.

In the case of the torque-transmission joint 15b of this example, a hollow hole 45 that penetrates in the axial direction through the damper section 26a is formed in the center of the damper section 26a, such that the damper section 26a has a hollow cylindrical shape. The dimension of the inner diameter of the hollow hole 45 is constant along the axial direction, and, for example, is ⅙ to ¼ (approximately ⅕ in the example in the figures) the size of the dimension of the outer diameter of the damper section 26a.

In this example, the modulus of elasticity of the damper section 26a can be reduced, so it is possible to increase the amount of thrust force that the damper section 26a can absorb. Moreover, by simply changing the inner diameter dimension and the shape of the hollow hole 45, it is possible to easily change the modulus of elasticity of the damper section 26a. Therefore, it becomes possible to easily adjust the amount of thrust force that can be absorbed, and the size of the biasing force.

The shape of the hollow hole that is formed in the damper section 26a is not limited to a through hole having the shape described above, and it is also possible to employ: a hollow hole 45a as illustrated in FIG. 27A that is a tapered hole, the inner diameter thereof becoming smaller going in a direction toward the center in the axial direction of the damper section 26a; a hollow hole 45b such as illustrated in FIG. 27B that is a stepped hole in which a small-diameter section in the center in the axial direction of the damper section 26a is connected to large-diameter sections on the outside in the axial direction; or a hollow hole 45c such as illustrated in FIG. 27C that has a bottom and is open only on one end surface in the axial direction. Furthermore, it is also possible to employ a deformation adjustment section that has a hollow hole having various construction such as a combination of these holes, or construction having plural holes.

Third Example

FIG. 28 to FIG. 38B illustrate a third example of an embodiment of the present invention. A feature of this example is that a convex curved surface section 46 that is formed so as to protrude in the axial direction from the entire surface of one end surface in the axial direction of the damper section 26b and that corresponds to a convex section as a deformation adjustment section is provided on one end section in the axial direction of the damper section 26b that is integrally provided with the inside shock-absorbing piece 31b of the shock-absorbing member 18c. The construction and operational effect of the other parts are the same as in the first example of an embodiment.

In the case of the torque-transmission joint 15c of this example, the convex curved surface section 46 has a semi elliptical spherical shape. The convex curved surface section 46 is such that a point on the center axis of the shock-absorbing member 18c and damper section 26b protrudes the most in the axial direction. The other end surface in the axial direction of the damper section 26b is a simple flat surface.

Figure 28:
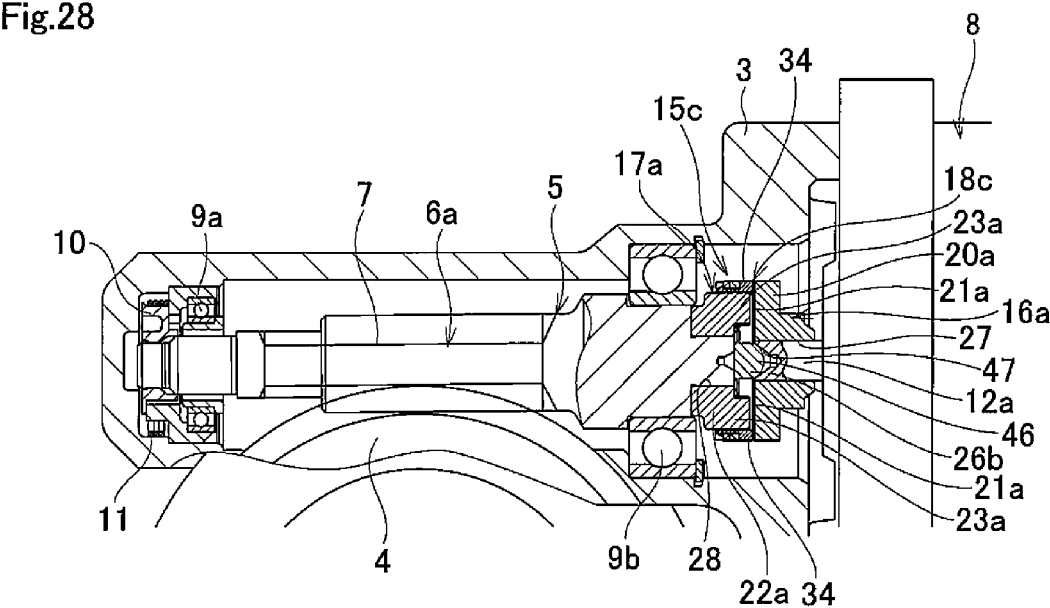
FIG. 28 is a cross-sectional view of the main parts of an electric power steering apparatus in which the torque-transmission joint of a third example of an embodiment of the present invention is assembled.
Figure 29:
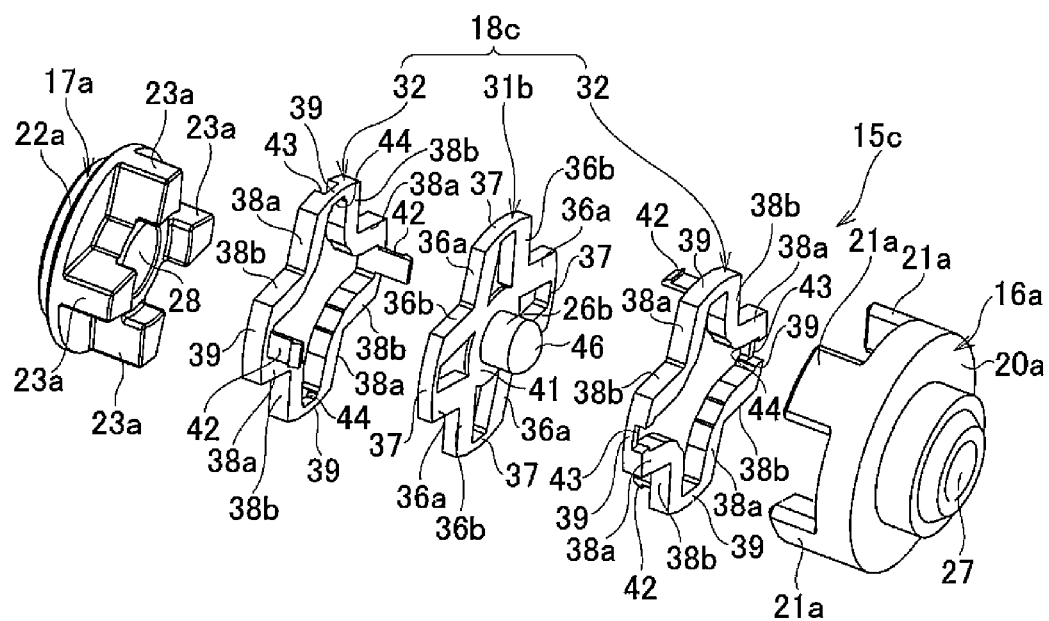
FIG. 29 is an exploded perspective view of the torque-transmission joint of the electric power steering apparatus illustrated in FIG. 28.
Figure 30:
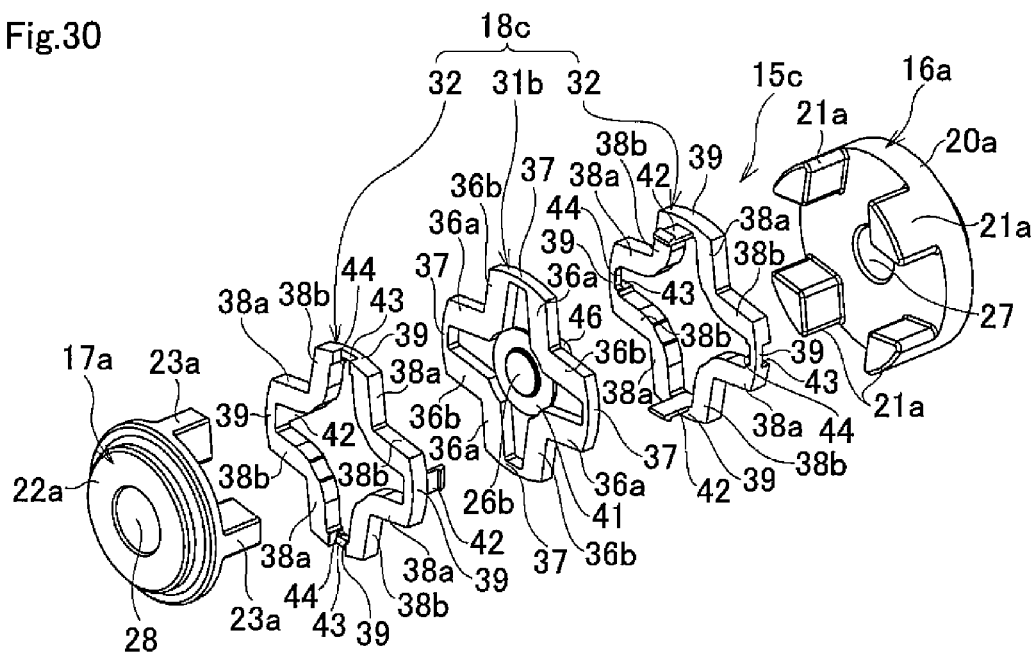
FIG. 30 is an exploded perspective view of the torque-transmission joint illustrated in FIG. 28 as seen from a different direction from FIG. 29.
Figure 31:
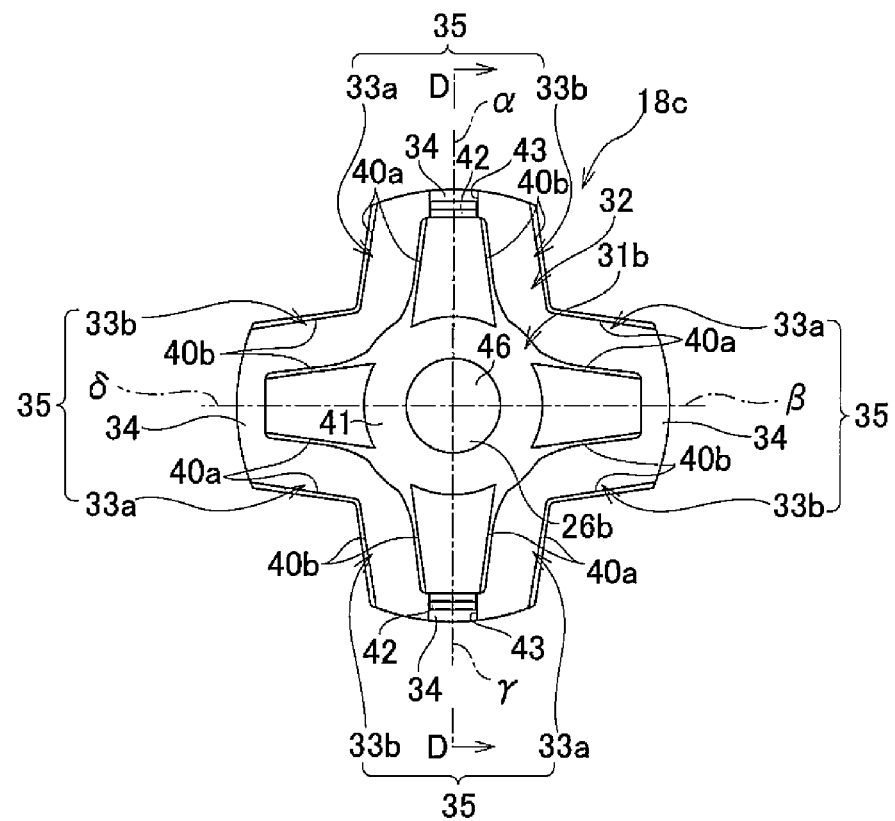
FIG. 31 is an end view of the shock-absorbing member of the torque-transmission joint illustrated in FIG. 28.
Figure 32:
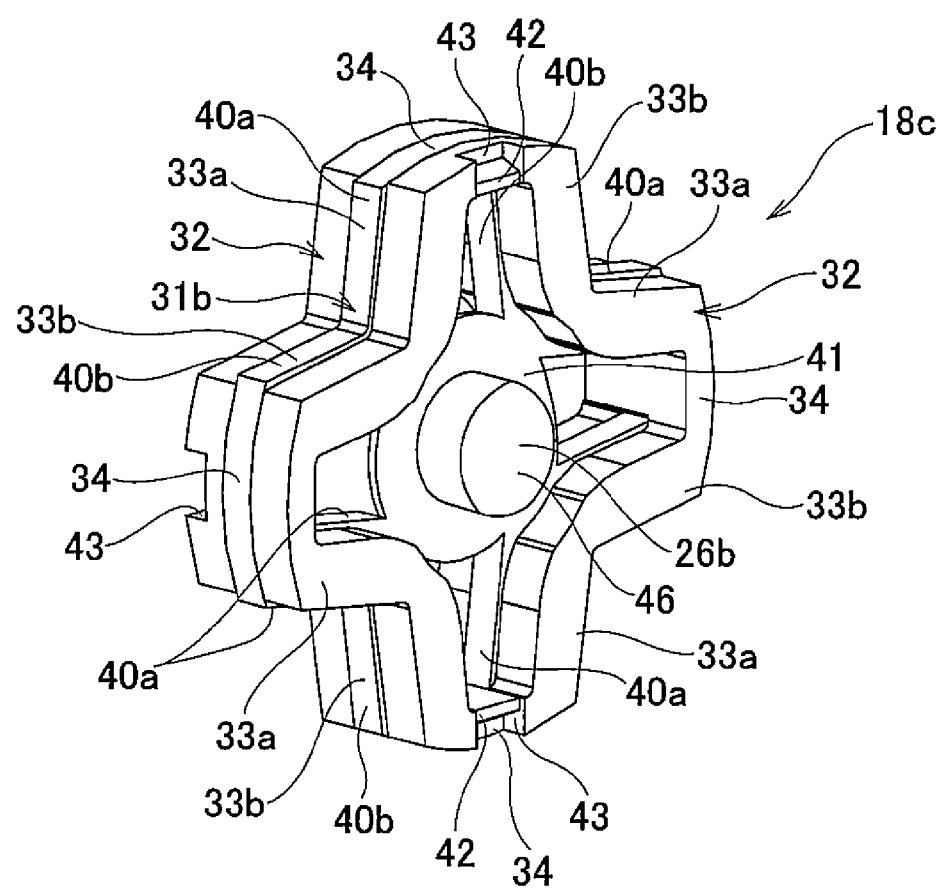
FIG. 32 is a perspective view of the shock-absorbing member illustrated in FIG. 31.
Figure 33:
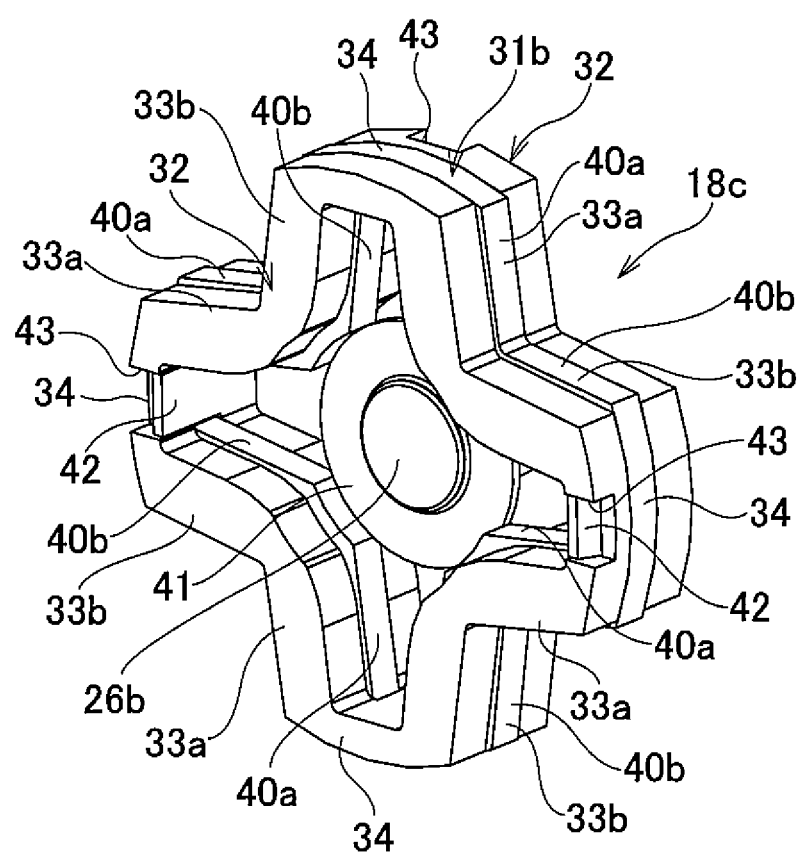
FIG. 33 is a perspective view of the shock-absorbing member illustrated in FIG. 31 as seen from a different direction from FIG. 32.
Figure 34:
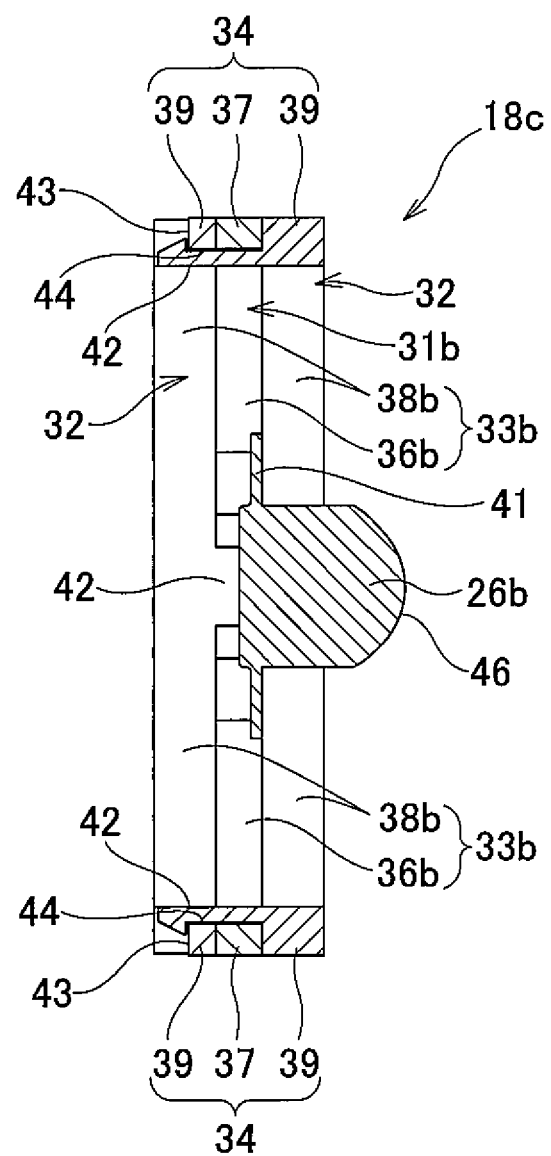
FIG. 34 is a cross-sectional view of section D-D in FIG. 31.
Figure 35:
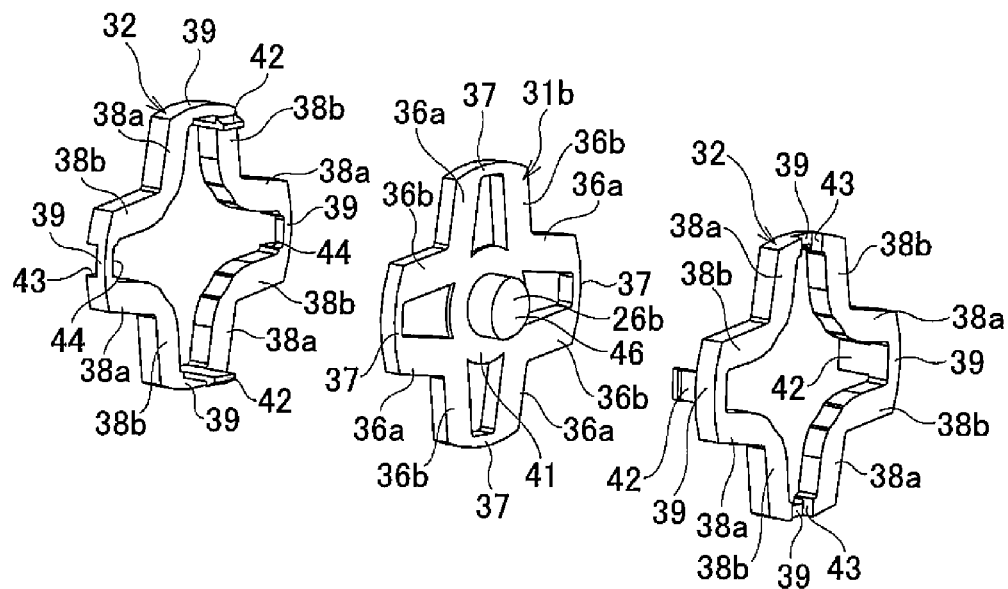
FIG. 35 is an exploded perspective view of the shock-absorbing member illustrated in FIG. 31.
Figure 36:
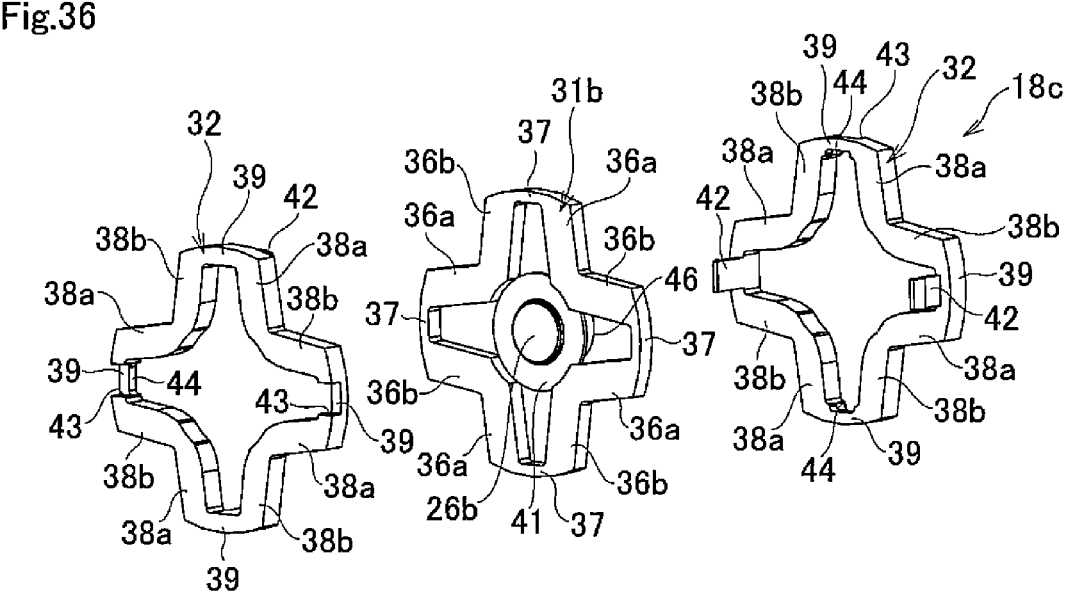
FIG. 36 is an exploded perspective view of the shock-absorbing member illustrated in FIG. 31 as seen from a different direction from FIG. 35.
Figure 37:
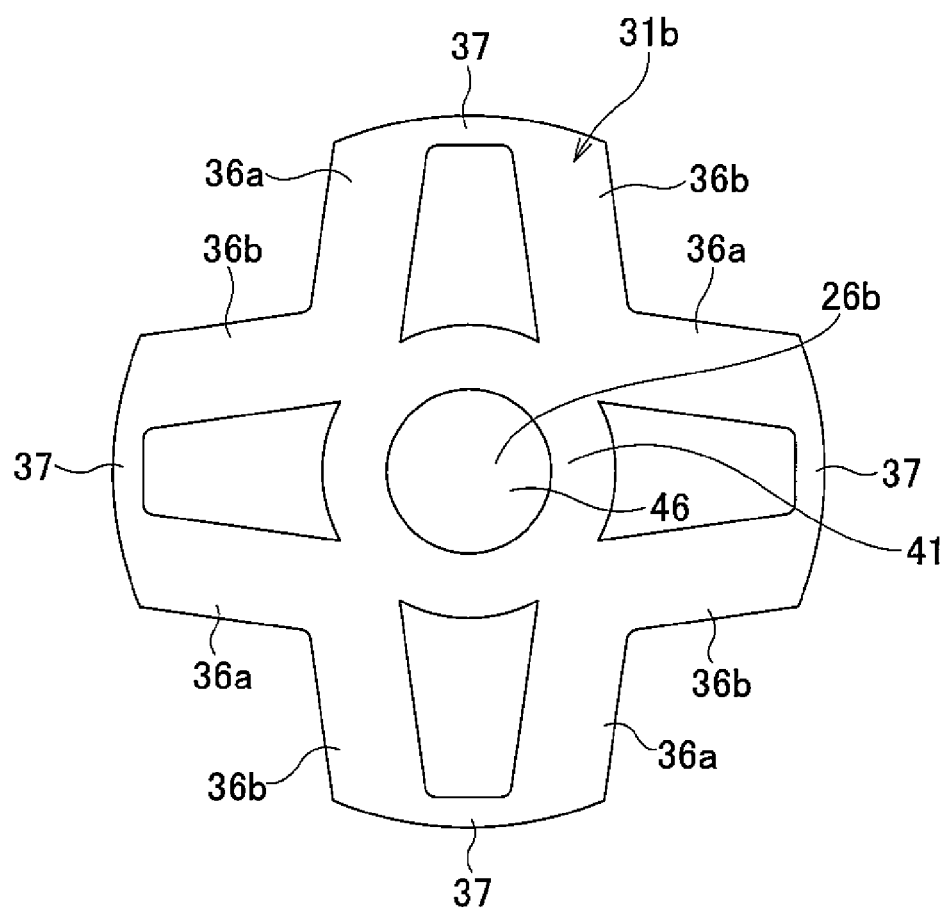
FIG. 37 is an end view of the inside shock-absorbing piece of the shock-absorbing member illustrated in FIG. 31.
Figure 38:
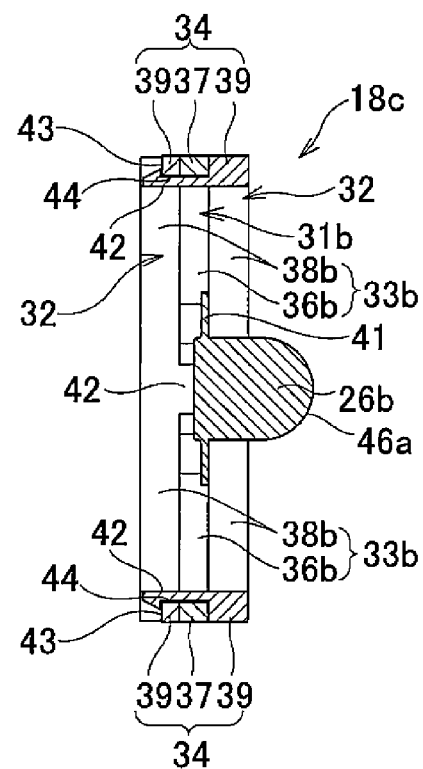
FIGS. 38A and 38B are cross-sectional views of two examples of substitutable shapes of the end surface of the piece in the axial direction of the damper section of the shock-absorbing member illustrated in FIG. 34.
Figure 38:
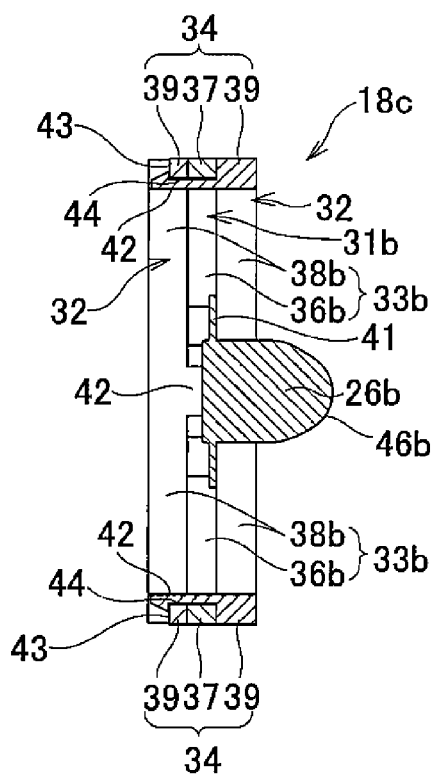

In this example, as illustrated in FIG. 28, a tapered concave section 47 is formed on the tip-end surface of the output shaft 12a such that the dimension of the inner diameter thereof becomes smaller going toward the rear, and when the damper section 26b is held on both sides in the axial direction between the tip-end surface of the output shaft 12a and the base-end surface of the worm shaft 6a, the convex curved surface section 46 is inserted tightly inside the tapered concave section 47 of the output shaft 12a and the surface of the convex curved surface section 46 presses against the inside surface of the tapered concave section 47.

In this example, the modulus of elasticity of the convex curved surface section 46 can be made to be lower than other portions, so it is possible to increase the amount of thrust force that is absorbed by the damper section 26b. Moreover, the modulus of elasticity of the damper section 26b can be easily changed by simply changing the size of the radius of curvature of the convex curved surface section 46 (rate of change of the cross-sectional area), so it is possible to easily adjust the amount of the thrust force that is absorbed and the size of the biasing force. Furthermore, in the assembled state, the convex curved surface section 46 of the damper section 26b is inserted inside the tapered concave section 47 of the output shaft 12a, so the output shaft 12a and worm shaft 6a that are connected by way of the torque-transmission joint 15c can be easily aligned.

The shape of the convex curved surface section that is formed on one end surface in the axial direction of the damper section 26b is not limited to a semi elliptical spherical shape, and it is also possible to employ a semi-spherical convex curved surface section 46a as illustrated in FIG. 38A, or a tapered partial elliptical spherical shape as illustrated in FIG. 38B, the cross-sectional surface area thereof having a small rate of change, and the major axis being the axis of rotation. Furthermore, it is also possible to employ a convex curved surface section that is a partial sphere or a partial elliptical sphere. On the other hand, the shape of the concave section that is formed on the tip-end surface of the output shaft 12a of the electric motor 8 is also not limited to being a tapered concave section, and it is possible to use any concave curved surface that conforms or matches the shape of the surface of the convex curved surface section. Furthermore, it is also possible to employ construction in which a convex curved surface section is provided on both end sections in the axial direction of the damper section 26b, a concave section is formed on the base-end surface of the worm shaft 6a, and the convex curved surface section on the other end section in the axial direction of the damper section 26b is inserted inside the concave section of the worm shaft 6a.

Fourth Example

FIG. 39 to FIG. 49C illustrate a fourth example of an embodiment of the present invention. A feature of this example is that a protruding section 48 that is formed so as to protrude in the axial direction from the center section of one end surface in the axial direction of a damper section 26c is provided on one end section in the axial direction of the damper section 26c that is integrally provided with the inside shock-absorbing piece 31c of the shock-absorbing member 18d, and corresponds to a convex section as a deformation adjustment section. The construction and operational effect of the other parts are the same as in the first example of an embodiment.

In the case of the torque-transmission joint 15d of this example, the protruding section 48 has a semi-spherical shape. The dimension of the outer diameter of the protruding section 48 is ⅕ to ½ the dimension of the outer diameter of the damper section 26c (approximately ¼ in the example in the figure), and the amount of protrusion in the axial direction (amount of protrusion with respect to the portion of one end surface in the axial direction that is separated from the protruding section 48) is ¹⁄₁₀ to ¼ the dimension in the axial direction of the damper section 26c (dimension of the portion except the protruding section 48) (approximately ⅛ in the example in the figure). The other end section in the axial direction of the damper section 26c is a simple flat surface.

Figure 39:
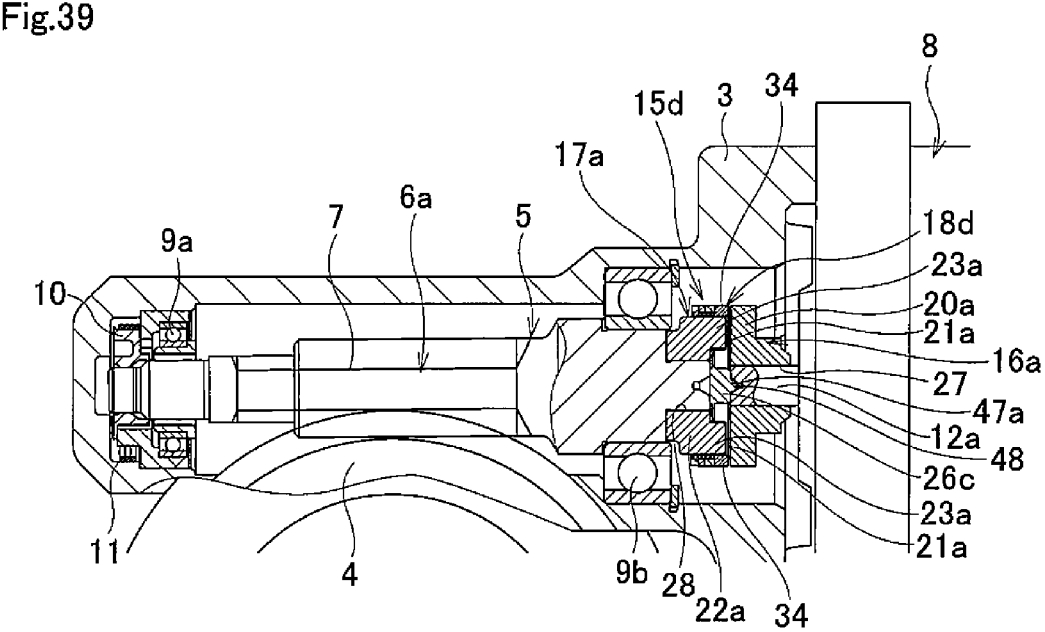
FIG. 39 is a cross-sectional view of the main parts of an electric power steering apparatus in which the torque-transmission joint of a third example of an embodiment of the present invention is assembled.
Figure 40:
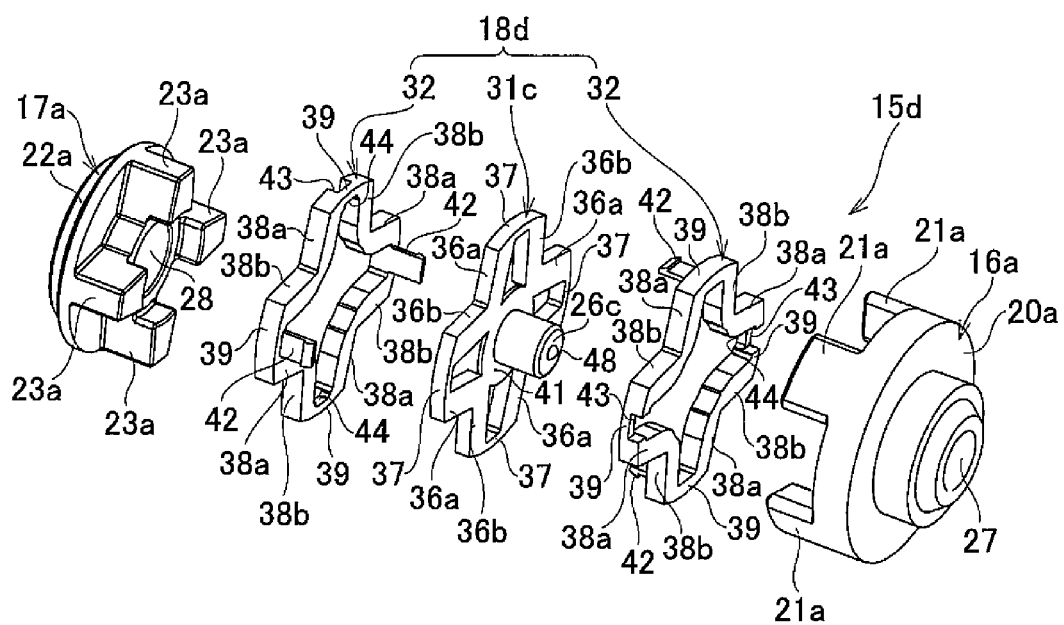
FIG. 40 is an exploded perspective view of the torque-transmission joint of the electric power steering apparatus in FIG. 39.
Figure 41:
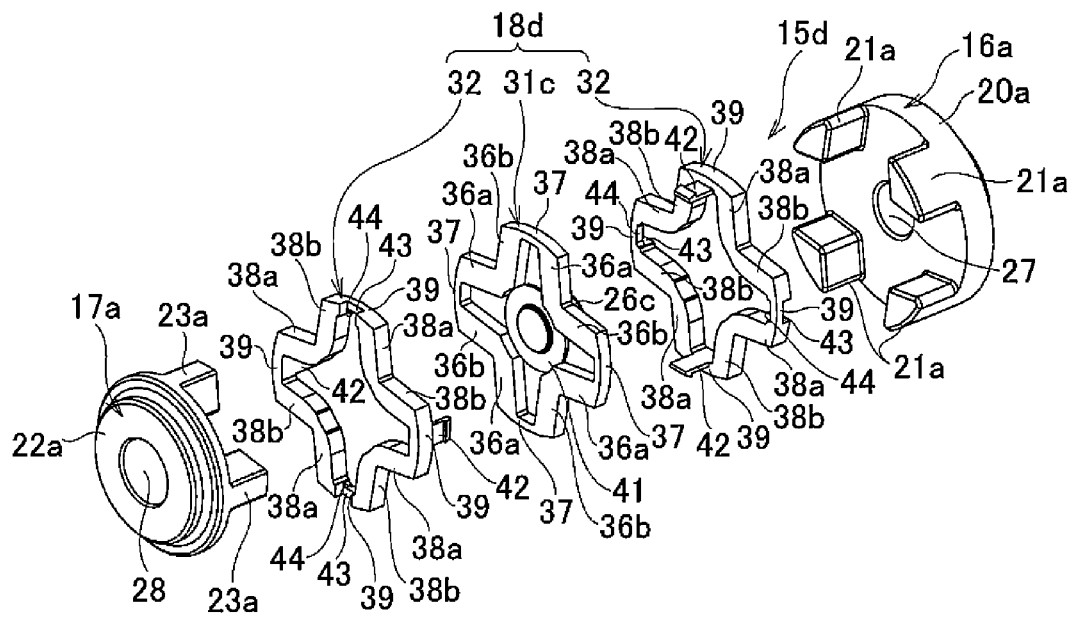
FIG. 41 is an exploded perspective view of the torque-transmission joint illustrated in FIG. 40 as seen from a different direction from FIG. 40.
Figure 42:
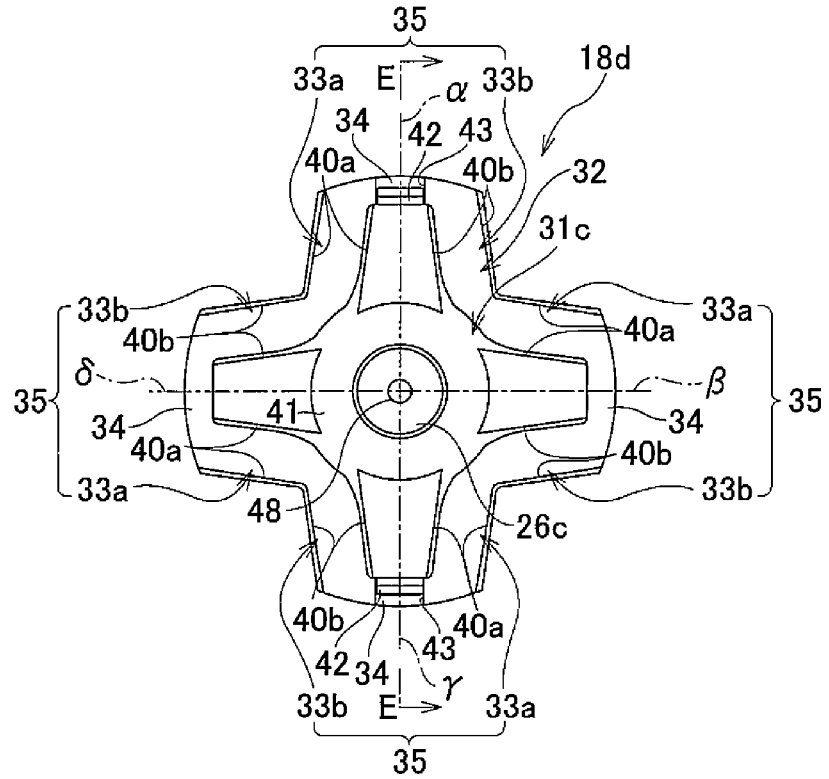
FIG. 42 is an end view of the shock-absorbing member of the torque-transmission joint illustrated in FIG. 40.
Figure 43:
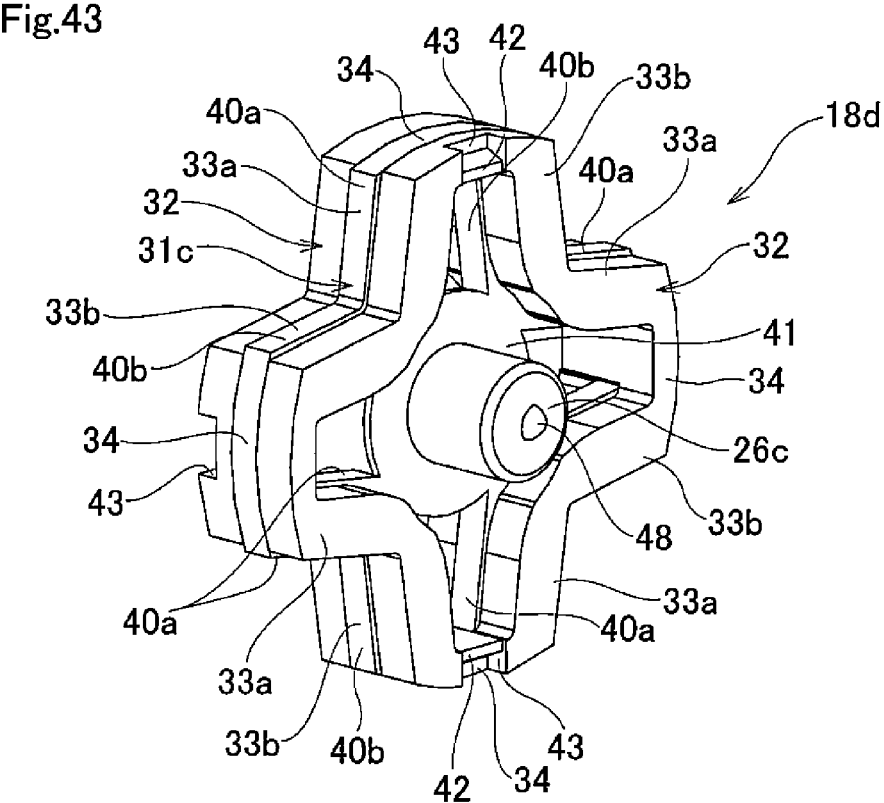
FIG. 43 is a perspective view of the shock-absorbing member illustrated in FIG. 42.
Figure 44:
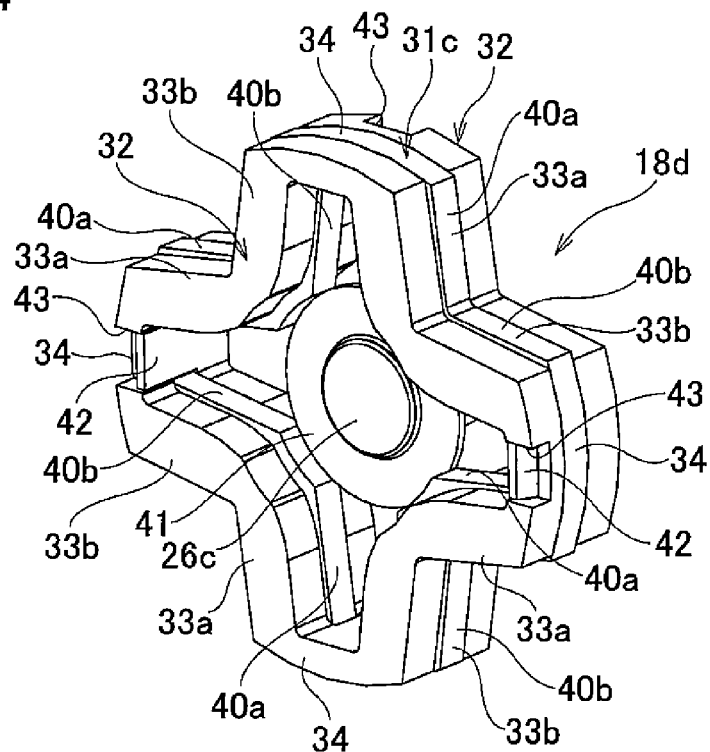
FIG. 44 is a perspective view of the shock-absorbing member illustrated in FIG. 42 as seen from a different direction from FIG. 43.
Figure 45:
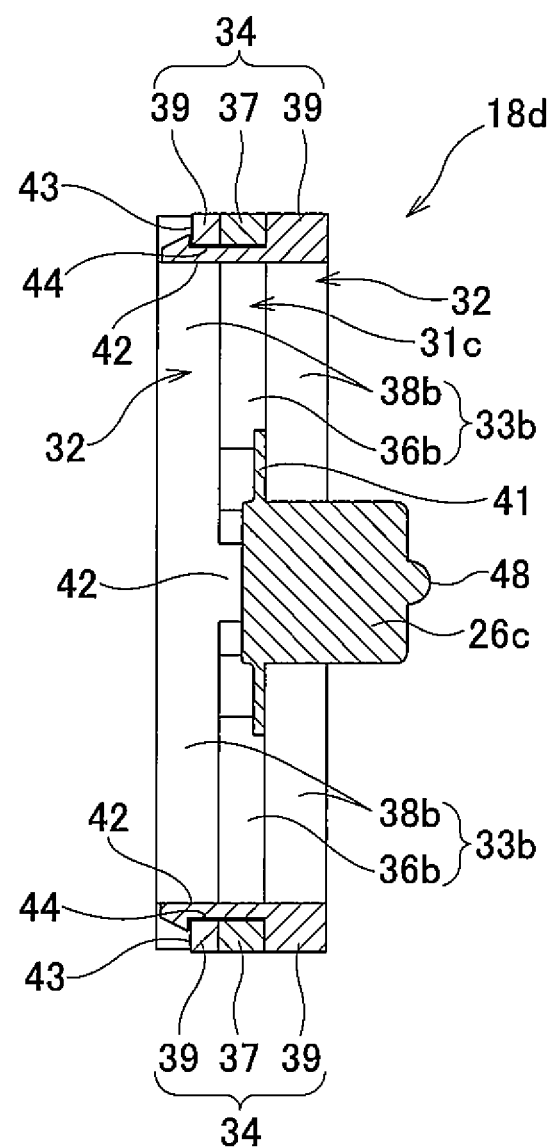
FIG. 45 is a cross-sectional view of section E-E in FIG. 42.
Figure 46:
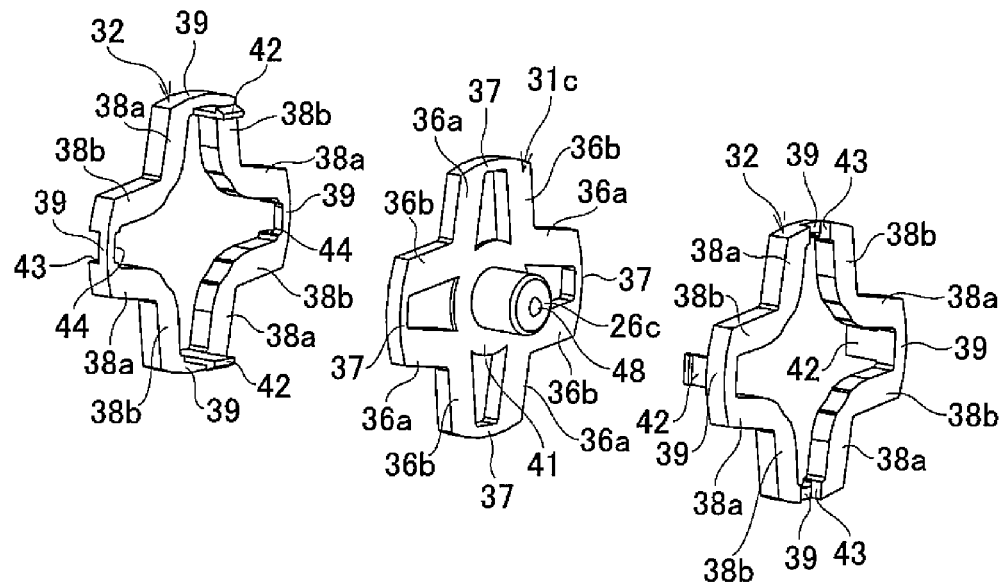
FIG. 46 is an exploded perspective view of the shock-absorbing member illustrated in FIG. 42.
Figure 47:
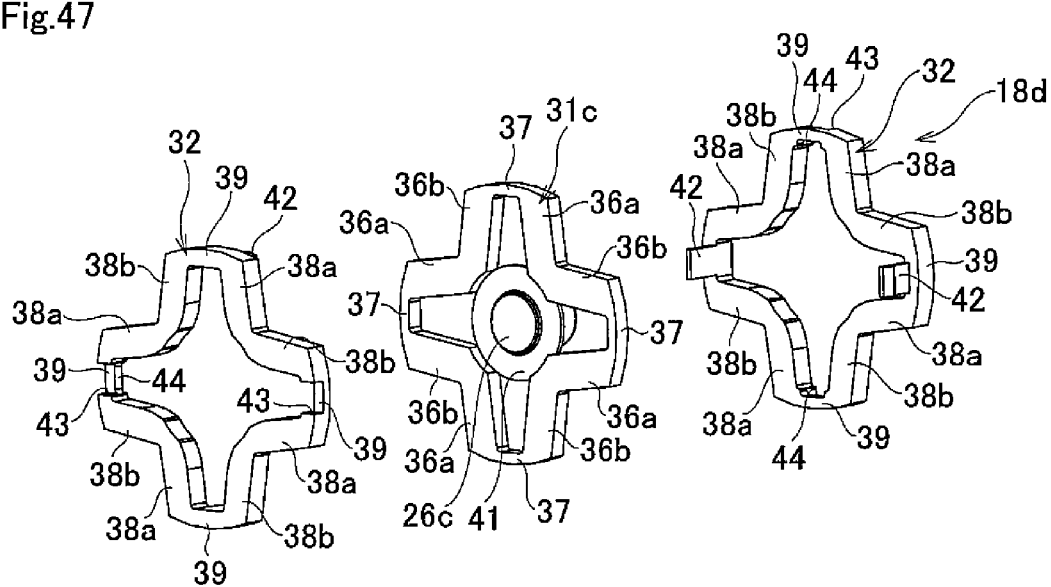
FIG. 47 is an exploded perspective view of the shock-absorbing member illustrated in FIG. 42 as seen from a different direction from FIG. 46.
Figure 48:
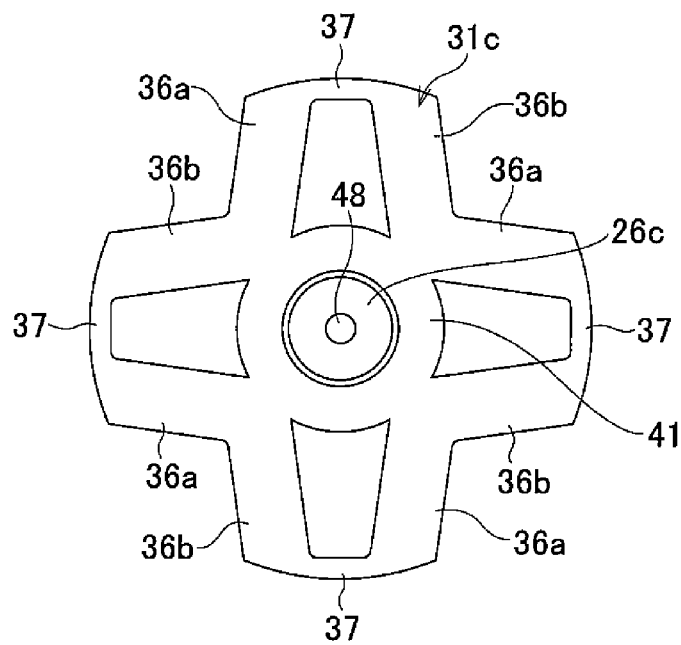
FIG. 48 is an end view of the inside shock-absorbing piece of the shock-absorbing member illustrated in FIG. 42.
Figure 49:
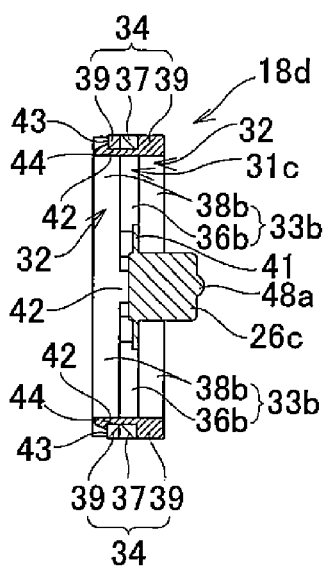
FIGS. 49A to 49C are cross-sectional views of three examples of substitutable shapes of the protruding section of the damper section of the shock-absorbing member illustrated in FIG. 45.
Figure 49:
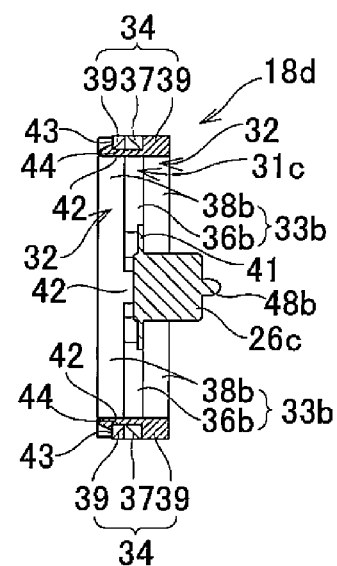
Figure 49:
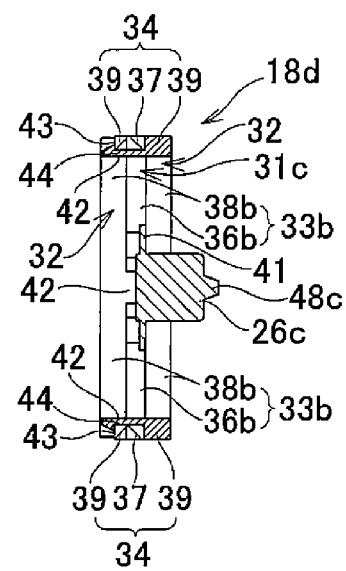

In this example, as illustrated in FIG. 39, a tapered concave section 47a that is tapered such that the dimension of the inner diameter becomes smaller going toward the rear is formed in the center section of the tip-end surface of the output shaft 12a, and when a damper section 26c is held on both sides in the axial direction between the tip-end surface of the output shaft 12a and the base-end surface of the worm shaft 6a, the protruding section 49 of the damper section 26c is inserted inside the tapered concave section 47a of the output shaft 12a so there is no backlash, and the protruding section 48 presses against the inside surface of the tapered concave section 47a.

In this example, the modulus of elasticity of the protruding section 48 can be made lower than other portions, so the amount of thrust force that the damper section 26c can absorb can be increased. Moreover, the modulus of elasticity of the damper section 26c can be easily changed by simply changing the dimension of the outer diameter and the amount of protrusion of the protruding section 48, so it is possible to easily adjust the amount of thrust force absorbed and the size of the biasing force. Furthermore, the protruding section 48 is inserted inside the tapered concave section 47a of the output shaft 12a, so the output shaft 12a and worm shaft 6a that are connected by way of the torque-transmission joint 15d can be easily aligned.

The shape of the protruding section that is formed in the center section of one end surface in the axial direction of the damper section 26c is not limited to being a semispherical shape, and it is also possible to employ a protruding section 48a having a partial spherical shape such as illustrated in FIG. 49A in which the outer-diameter dimension and the amount of protrusion in the axial direction is smaller, a semi-elliptical spherical protruding section 48b such as illustrated in FIG. 49B, or a truncated conical shaped protruding section 48c such as illustrated in FIG. 49C. On the other hand, the shape of the concave section that is formed in the tip-end surface of the output shaft 12a of the electric motor 8 is also not limited to being a tapered concave section, and any shape, such as a concave curved surface, that conforms to the protruding section of the damper section can be employed. Furthermore, it is also possible to employ construction in which, together with providing a protruding section on the other end section in the axial direction of the damper section 26c, a concave section is formed in the base-end surface of the worm shaft 6a, and the protruding section on the other end section in the axial direction of the damper section 26c is inserted inside the concave section of the worm shaft 6a.

Other Variations

Figure 50:
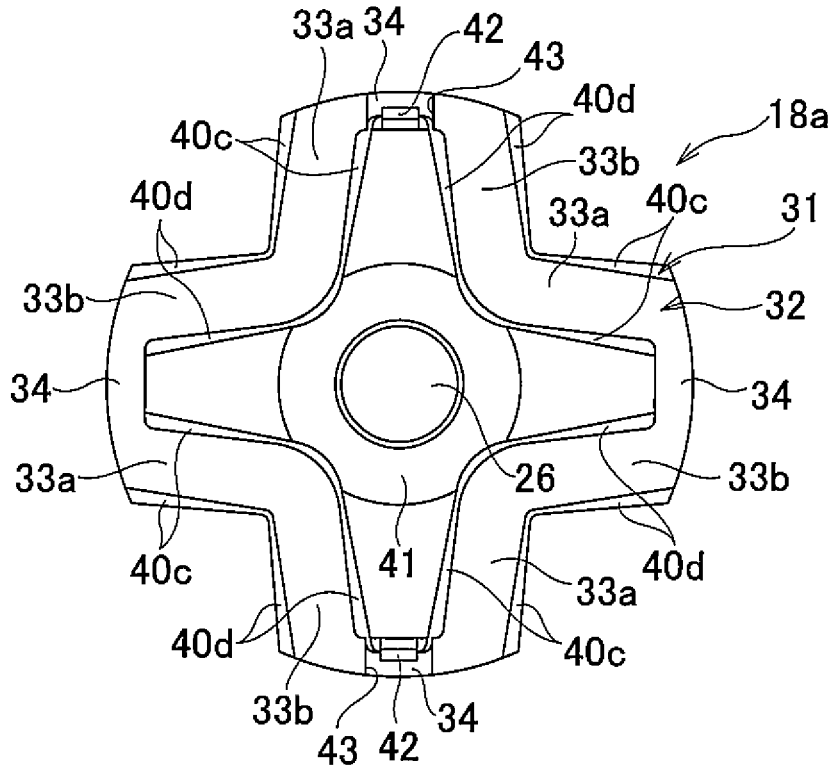
FIGS. 50A and 50B are end views of two examples of substitutable shapes of the bulging sections of the shock-absorbing member illustrated in FIG. 9.
Figure 50:
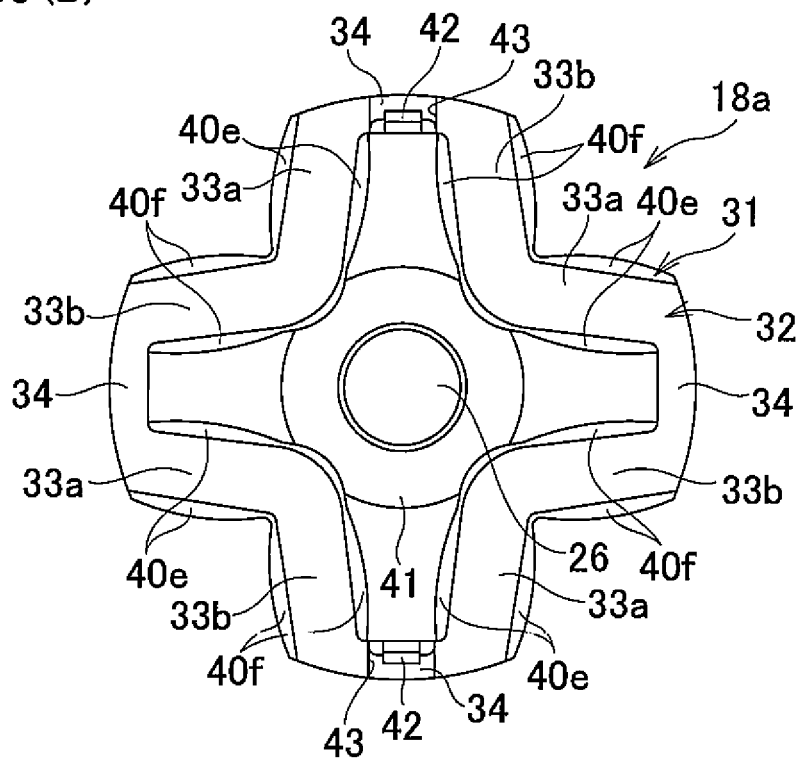

In each of the examples of an embodiment of the present invention, bulging sections 40a, 40b having a constant width dimension (amount of protrusion) along the length direction of the held sections 33a, 33b were used as bulging sections of the shock-absorbing member. However, the shape of the bulging sections is not limited to this kind of construction in which the width dimension along the length direction of the held sections does not change, and it is also possible to employ bulging sections 40c, 40d such as illustrated in FIG. 50A in which the shape of the side surface in the axial direction is a triangular shape where the width dimension becomes larger going toward the outer-diameter side of the held sections 33a, 33b, or it is also possible to employ bulging sections 40e, 40f such as illustrated in FIG. 50B in which the shape of the side surface in the axial direction is a convex arc shape where the width dimension is larger toward the center in the length direction of the held sections 33a, 33b. Bulging sections having this kind of construction display a resilience that gradually increases, so are able to cause the transmission torque to change more gently.

Figure 51:
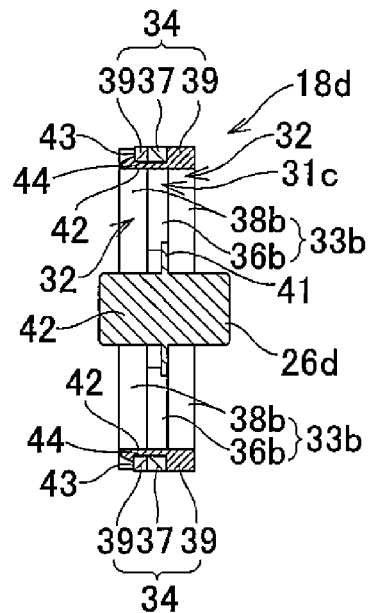
FIGS. 51A and 51B are cross-sectional views of substitutable shapes of the installation position of the damper section illustrated in FIG. 1.
Figure 51:
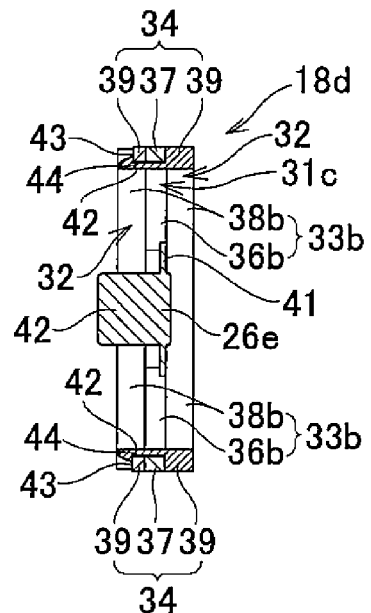
Figure 52:
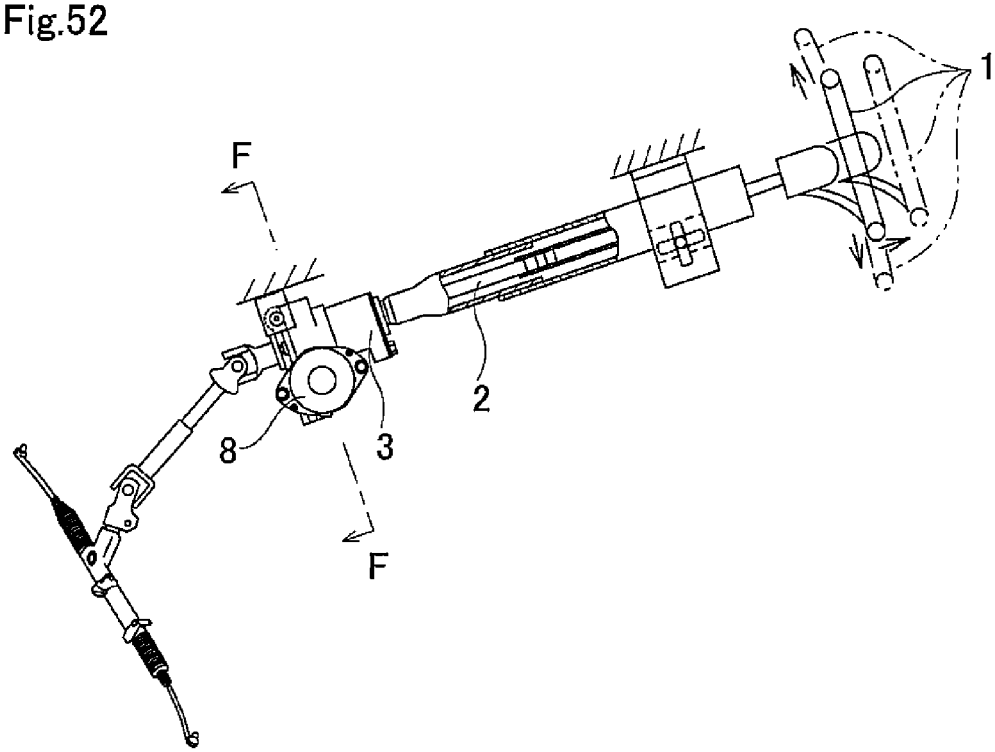
FIG. 52 is a partial vertical cross-sectional view illustrating an example of an automobile steering apparatus.
Figure 53:
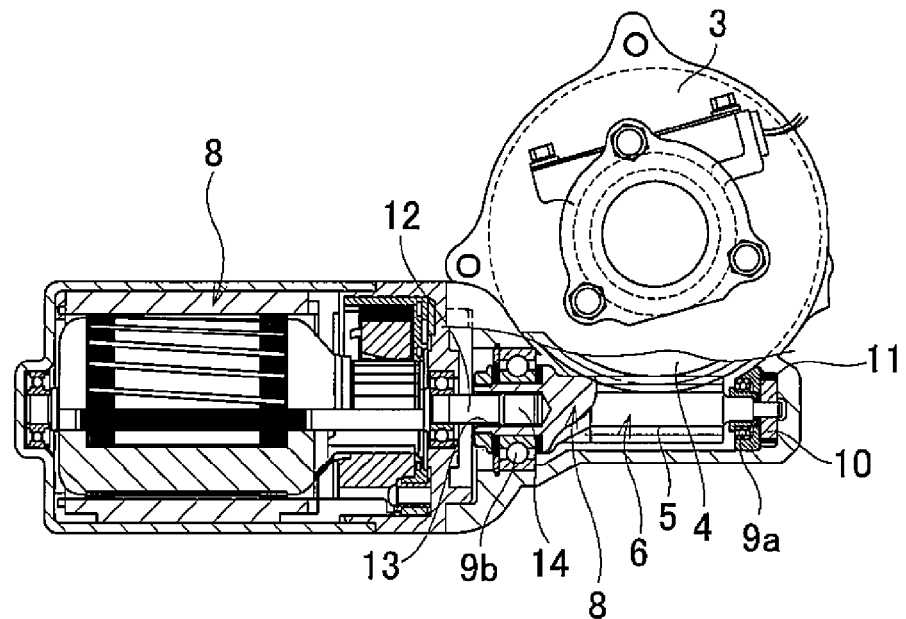
FIG. 53 is an enlarged cross-sectional view of section F-F in FIG. 52, and illustrates a first example of conventional construction of an electric power steering apparatus.
Figure 54:
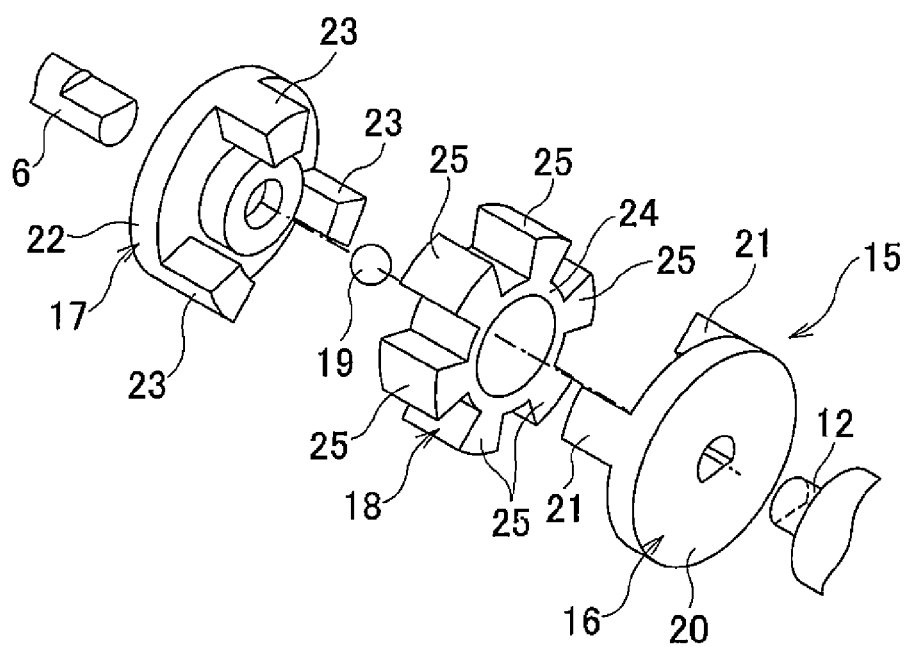
FIG. 54 is an exploded perspective view illustrating a torque-transmission joint having conventional construction.
Figure 55:
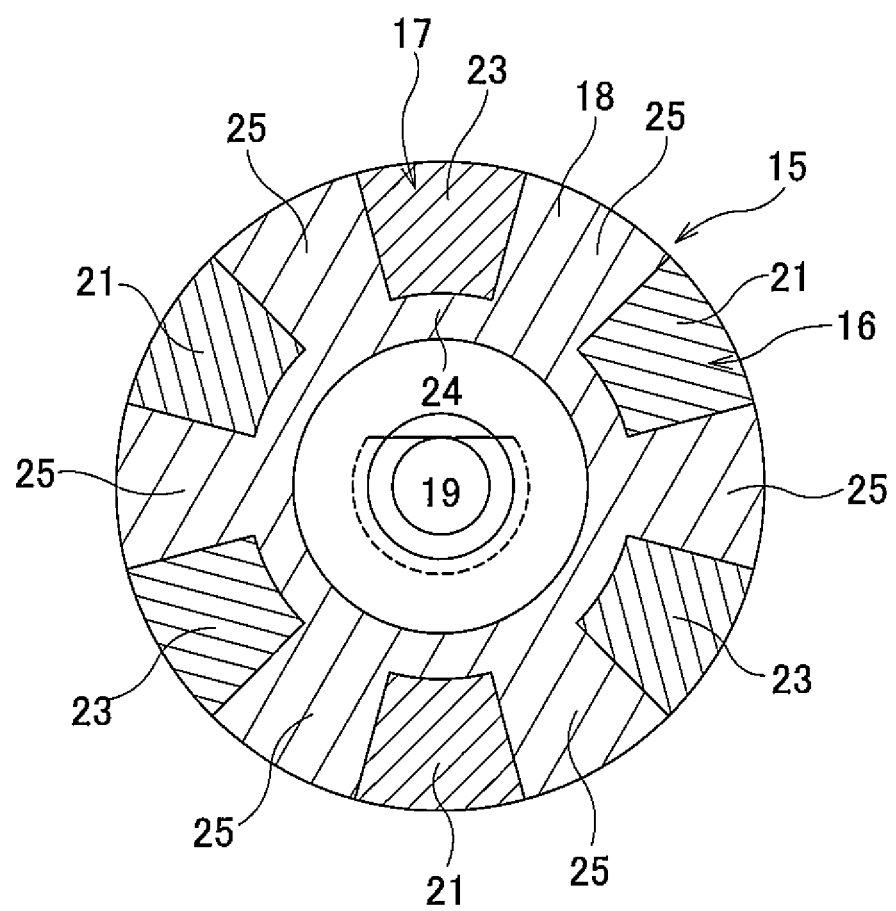
FIG. 55 is a cross-sectional view of the center section in the axial direction of the torque-transmission joint illustrated in FIG. 54.

In each of the examples of an embodiment of the present invention, as the damper section, a damper section 26 is provided having construction in which the damper section is formed so as to protrude to one side (output shaft 12a side of the electric motor 8) from one side surface in the axial direction of the inside shock-absorbing piece 31, and in the assembled state of the shock-absorbing member 18a, greatly protrude to the outside in one axial direction (output shaft 12a side) further than one side surface in the axial direction of the shock-absorbing member 18a. However, the installation position of the damper section is also not limited to the construction of the damper section 26, and it is also possible to employ a damper section 26d such as illustrated in FIG. 51A having construction in which the damper section 26d is formed so as to protrude to both sides (output shaft 12a side of the electric motor 8, and worm shaft 6a side) from both side surfaces in the axial direction of the inside shock-absorbing piece 31, and in the assembled state of the shock-absorbing member 18a, greatly protrudes to the outside in both axial directions (output shaft 12 side, and worm shaft 6a side) further than both surface sides in the axial direction of the shock-absorbing member 18a; or a damper section 26e such as illustrated in FIG. 51B having construction in which the damper section 26e is formed so as to protrude to the other side (worm shaft 6a side) from one side surface in the axial direction of the inside shock-absorbing piece 31, and in the assembled state of the shock-absorbing member 18a, greatly protrudes to the outside in the other axial direction (worm shaft 6a side) further than one side in the axial direction of the shock-absorbing member 18a. By adjusting the installation position of the damper section in this way, it is possible to easily adjust the function for absorbing thrust force that is displayed by the damper section.

In addition, construction for connecting plural shock-absorbing pieces together is not limited to the construction described above; for example, it is also possible to employ various kinds of conventionally known joint construction such as a snap-fit joint in which convex sections are fitted with concave sections. Moreover, in each example of an embodiment of the present invention, in order to reduce cost by using common parts, the shape of the pair of outside shock-absorbing pieces was the same, however, construction can also be employed in which outside shock-absorbing pieces having different shapes are used; for example, forming four fastening tabs on the outside shock-absorbing piece on one side, and forming four engaging concave sections on the outside shock-absorbing piece on the other side.

Furthermore, when embodying the present invention, it is possible to replace the driving-side transmission member 16a and the driven-side transmission member 17a that are illustrated in each of the examples of an embodiment, and use a member having the same shape as the driven-side transmission member 17a as the driving-side transmission member, and use a member having the same shape as the driving-side transmission member 16a as the driven-side transmission member. The construction of each of the examples of an embodiment described above, unless there is conflict, can be appropriately combined.

INDUSTRIAL APPLICABILITY

In each of the examples of an embodiment described above, the torque-transmission joint of the present invention is used as a torque-transmission joint for transmitting torque between the output shaft of an electric motor of an electric power steering apparatus and a worm shaft of a worm of a worm reducer, however, the present invention is not limited to this, and can be widely applied to a torque-transmission joint that is used for transmitting torque between a driving shaft and driven shaft of various kinds of machinery.

EXPLANATION OF REFERENCE NUMBERS

1 Steering wheel
2 Steering shaft
3 Housing
4 Worm wheel
5 Worm
6 Worm shaft
7 Worm teeth
8 Electric motor
9a, 9b Rolling bearing
10 Pressure piece
11 Coil spring
12, 12a Output shaft
13 Spline hole
14 Spline shaft section
15, 15a Torque-transmission joint
16, 16a Driving-side transmission member
17, 17a Driven-side transmission member
18, 18a to 18d Shock-absorbing member
19 Steel ball
20, 20a Driving-side base section
21, 21a Driving-side arm section
22, 22a Driven-side base section
23, 23a Driven-side base section
24 Cylindrical section
25 Held section
26, 26a to 26e Damper section
27 Driving-side serration hole
28 Driven-side serration hole
29a, 29b Side surface in the circumferential direction
30a, 30b Side surface in the circumferential direction
31, 31a to 31c Inside shock-absorbing piece
32 Outside shock-absorbing piece
33a, 33b Held section
34 Outside cover section
35 Combined held section
36a, 36b Inside held piece
37 Inside cover piece
38a, 38b Outside held piece
39 Outside cover piece
40a to 40f Bulging section
41 Ring-shaped connecting section
42 Fastening tab
43 Engaging concave section
44 Concave groove
45, 45a to 45c Hollow hole
46, 46a, 46b Convex curved surface section
47, 47a Tapered concave section
48, 48a to 48c Protruding section

What is claimed is:

1. A torque-transmission joint for transmitting torque between a driving shaft and a driven shaft that are arranged in series with each other in an axial direction thereof, comprising:
a driving-side transmission member concentrically supported by an end section of the driving shaft;
a driven-side transmission member concentrically supported by an end section of the driven shaft;
a shock-absorbing member made from an elastic material and provided between the driving-side transmission member and the driven-side transmission member; and
a damper section held directly between end surfaces of the driving shaft and the driven shaft,
the driving-side transmission member comprising:
a driving-side base section supported by the end section of the driving shaft; and
plural driving-side arm sections provided intermittently in a circumferential direction on a surface of the driving-side base section that faces the driven-side transmission member, the plural driving-side arm sections respectively protruding in the axial direction therefrom;
the driven-side transmission member comprising:
a driven-side base section supported by the end section of the driven shaft; and
plural driven-side arm sections provided intermittently in a circumferential direction on a surface of the driven-side base section that faces the driving-side transmission member, the plural driven-side arm sections respectively protruding in the axial direction therefrom;

the shock-absorbing member comprising plural held sections; and the driving-side arm sections and the driven-side arm sections arranged alternately in the circumferential direction, and the held sections placed in between side surfaces of the driving-side arm sections and driven-side arm sections that are adjacent to each other in the circumferential direction; and the damper section comprising a ring-shaped connecting section thinner than the damper section, the damper section integrally provided with the shock-absorbing member by way of the ring-shaped connecting section being connected to the held sections.

2. The torque-transmission joint according to claim 1, wherein a deformation adjustment section that is concave inward or protrudes outward in the axial direction from an end surface of the damper section is provided in the damper section.

3. The torque-transmission joint according to claim 2, wherein the deformation adjustment section comprises a hollow hole that is opened in the end surface of the damper section in the axial direction.

4. An electric power steering apparatus, comprising:
a housing supported by a vehicle body or a member fixed to the vehicle body so as to not rotate;
a rotating steering shaft provided so as to be able to rotate freely with respect to the housing and to apply a steering angle to steered wheels by being rotated by operating a steering wheel;
a worm wheel concentrically supported inside the housing by part of the rotating steering shaft, and rotating with the rotating steering shaft;
a worm comprising a worm shaft and worm teeth that are provided around a middle section of the worm shaft in an axial direction of the worm shaft, so that in a state where the worm teeth are engaged with the worm wheel, both end sections of the worm shaft in the axial direction are supported by bearings so as to be able to rotate freely relative to the housing; and
an electric motor for rotating and driving the worm, the electric motor provided with an output shaft;
the output shaft of the electric motor connected to the worm shaft by a torque-transmission joint so that torque can be transmitted, the output shaft corresponding to the driving shaft of claim 1, and the worm shaft corresponding to the driven shaft of claim 1, with the torque-transmission joint being the torque-transmission joint of claim 3.

5. The torque-transmission joint according to claim 2, wherein the deformation adjustment section comprises a convex section that protrudes outward in the axial direction from the end surface of the damper section.

6. An electric power steering apparatus, comprising:
a housing supported by a vehicle body or a member fixed to the vehicle body so as to not rotate;
a rotating steering shaft provided so as to be able to rotate freely with respect to the housing and to apply a steering angle to steered wheels by being rotated by operating a steering wheel;
a worm wheel concentrically supported inside the housing by part of the rotating steering shaft, and rotating with the rotating steering shaft;
a worm comprising a worm shaft and worm teeth that are provided around a middle section of the worm shaft in an axial direction of the worm shaft, so that in a state where the worm teeth are engaged with the worm wheel, both end sections of the worm shaft in the axial direction are supported by bearings so as to be able to rotate freely relative to the housing; and
an electric motor for rotating and driving the worm, the electric motor provided with an output shaft;
the output shaft of the electric motor connected to the worm shaft by a torque-transmission joint so that torque can be transmitted, the output shaft corresponding to the driving shaft of claim 1, and the worm shaft corresponding to the driven shaft of claim 1, with the torque-transmission joint being the torque-transmission joint of claim 5.

7. An electric power steering apparatus, comprising:
a housing supported by a vehicle body or a member fixed to the vehicle body so as to not rotate;
a rotating steering shaft provided so as to be able to rotate freely with respect to the housing and to apply a steering angle to steered wheels by being rotated by operating a steering wheel;
a worm wheel concentrically supported inside the housing by part of the rotating steering shaft, and rotating with the rotating steering shaft;
a worm comprising a worm shaft and worm teeth that are provided around a middle section of the worm shaft in an axial direction of the worm shaft, so that in a state where the worm teeth are engaged with the worm wheel, both end sections of the worm shaft in the axial direction are supported by bearings so as to be able to rotate freely relative to the housing; and
an electric motor for rotating and driving the worm, the electric motor provided with an output shaft;
the output shaft of the electric motor connected to the worm shaft by a torque-transmission joint so that torque can be transmitted, the output shaft corresponding to the driving shaft of claim 1, and the worm shaft corresponding to the driven shaft of claim 1, with the torque-transmission joint being the torque-transmission joint of claim 2.

8. The torque-transmission joint according to claim 1, wherein
each of the plural held sections has a flat plate shape;
a combined held section is constructed by: a pair of held sections that are adjacent in the circumferential direction and mirror symmetrical about a virtual plane including a center axis of the shock-absorbing member, and that are inclined with respect to a radial direction of the shock-absorbing member in a direction toward the virtual plane while going outward in the radial direction; and an outer-diameter cover section that connects end sections of the pair of held sections on an outer-diameter side of the shock-absorbing member; and
the shock-absorbing member is formed into a non-circular tubular shape by arranging a plurality of the combined held sections so as to be uniformly spaced in the circumferential direction.

9. An electric power steering apparatus, comprising:
a housing supported by a vehicle body or a member fixed to the vehicle body so as to not rotate;
a rotating steering shaft provided so as to be able to rotate freely with respect to the housing and to apply a steering angle to steered wheels by being rotated by operating a steering wheel;
a worm wheel concentrically supported inside the housing by part of the rotating steering shaft, and rotating with the rotating steering shaft;

a worm comprising a worm shaft and worm teeth that are provided around a middle section of the worm shaft in an axial direction of the worm shaft, so that in a state where the worm teeth are engaged with the worm wheel, both end sections of the worm shaft in the axial direction are supported by bearings so as to be able to rotate freely relative to the housing; and an electric motor for rotating and driving the worm, the electric motor provided with an output shaft;

the output shaft of the electric motor connected to the worm shaft by a torque-transmission joint so that torque can be transmitted, the output shaft corresponding to the driving shaft of claim 1, and the worm shaft corresponding to the driven shaft of claim 1, with the torque-transmission joint being the torque-transmission joint of claim 8.

10. The torque-transmission joint according to claim 1, wherein the shock-absorbing member comprises plural shock-absorbing pieces that are superimposed on each other in the axial direction, with the damper section being integrally provided with one of the plural shock-absorbing pieces.

11. An electric power steering apparatus, comprising:

a housing supported by a vehicle body or a member fixed to the vehicle body so as to not rotate;

a rotating steering shaft provided so as to be able to rotate freely with respect to the housing and to apply a steering angle to steered wheels by being rotated by operating a steering wheel;

a worm wheel concentrically supported inside the housing by part of the rotating steering shaft, and rotating with the rotating steering shaft;

a worm comprising a worm shaft and worm teeth that are provided around a middle section of the worm shaft in an axial direction of the worm shaft, so that in a state where the worm teeth are engaged with the worm wheel, both end sections of the worm shaft in the axial direction are supported by bearings so as to be able to rotate freely relative to the housing; and an electric motor for rotating and driving the worm, the electric motor provided with an output shaft;

the output shaft of the electric motor connected to the worm shaft by a torque-transmission joint so that torque can be transmitted, the output shaft corresponding to the driving shaft of claim 1, and the worm shaft corresponding to the driven shaft of claim 1, with the torque-transmission joint being the torque-transmission joint of claim 10.

12. An electric power steering apparatus, comprising:

a housing supported by a vehicle body or a member fixed to the vehicle body so as to not rotate;

a rotating steering shaft provided so as to be able to rotate freely with respect to the housing and to apply a steering angle to steered wheels by being rotated by operating a steering wheel;

a worm wheel concentrically supported inside the housing by part of the rotating steering shaft, and rotating with the rotating steering shaft;

a worm comprising a worm shaft and worm teeth that are provided around a middle section of the worm shaft in an axial direction of the worm shaft, so that in a state where the worm teeth are engaged with the worm wheel, both end sections of the worm shaft in the axial direction are supported by bearings so as to be able to rotate freely relative to the housing; and an electric motor for rotating and driving the worm, the electric motor provided with an output shaft;

the output shaft of the electric motor connected to the worm shaft by a torque-transmission joint so that torque can be transmitted, the output shaft corresponding to the driving shaft of claim 1, and the worm shaft corresponding to the driven shaft of claim 1, with the torque-transmission joint being the torque-transmission joint of claim 1.

\* \* \* \* \*